(12) United States Patent
Vandyke et al.

(10) Patent No.: US 12,161,264 B2
(45) Date of Patent: Dec. 10, 2024

(54) DRIP TRAY FOR A COOKING DEVICE

(71) Applicant: LIFETIME PRODUCTS, INC., Clearfield, UT (US)

(72) Inventors: Lynn Vandyke, Layton, UT (US); Donald Waite, North Ogden, UT (US); Jeffrey D. Hancock, Uintah, UT (US); Christopher Schenck, Uintah, UT (US)

(73) Assignee: LIFETIME PRODUCTS, INC., Clearfield, UT (US)

( * ) Notice: Subject to any disclaimer, the term of this patent is extended or adjusted under 35 U.S.C. 154(b) by 336 days.

(21) Appl. No.: 17/195,480

(22) Filed: Mar. 8, 2021

(65) Prior Publication Data
US 2022/0279970 A1    Sep. 8, 2022

(51) Int. Cl.
A47J 37/07    (2006.01)
A23B 4/052    (2006.01)
A47J 37/06    (2006.01)

(52) U.S. Cl.
CPC .......... *A47J 37/0786* (2013.01); *A23B 4/052* (2013.01); *A47J 37/0664* (2013.01); *A47J 37/0713* (2013.01); *A23V 2002/00* (2013.01)

(58) Field of Classification Search
CPC .......................... A47J 37/0664; A47J 37/0786
USPC .................................................... 99/446, 444
See application file for complete search history.

(56) References Cited

U.S. PATENT DOCUMENTS

| | | |
|---|---|---|
| 652,531 A | 6/1900 | Carlson |
| D60,186 S | 1/1922 | Woodson |
| 2,353,278 A | 7/1944 | Arthur et al. |
| 2,444,985 A | 7/1948 | Fulton |
| 2,666,426 A | 1/1954 | Pollard |
| 2,894,448 A | 7/1959 | Elmer et al. |
| 2,902,026 A | 9/1959 | Hathorn, Jr. |
| 2,909,170 A | 10/1959 | Hathorn, Jr. |
| 3,002,444 A | 10/1961 | Hoebing |
| 3,296,955 A | 1/1967 | Schaniel |
| 3,327,616 A | 6/1967 | Ozymy |

(Continued)

FOREIGN PATENT DOCUMENTS

| | | |
|---|---|---|
| CN | 103561620 A | 2/2014 |
| CN | 204683373 U | 10/2015 |

(Continued)

OTHER PUBLICATIONS

U.S. Appl. No. 17/195,477, filed Mar. 8, 2021.

(Continued)

*Primary Examiner* — Reginald Alexander
(74) *Attorney, Agent, or Firm* — Maschoff Brennan

(57) ABSTRACT

A cooking device may include a cooking chamber and a drip tray may be disposed within the cooking chamber. The drip tray may include one or more portions such as a first portion, a second portion, a third portion, and a fourth portion. The first portion and the second portion may be disposed in an angled configuration, such as a V-shaped configuration. In addition, the third portion and the fourth portion may be disposed in an angled configuration, such as a V-shaped configuration. The second portion and the third portion may be disposed in an angled configuration, such as an inverted V-shaped configuration. The drip tray may be sized and configured to control at least a portion of a flow of thermal energy within the cooking device.

20 Claims, 19 Drawing Sheets

(56) References Cited

U.S. PATENT DOCUMENTS

| | | |
|---|---|---|
| D208,179 S | 7/1967 | King et al. |
| 3,541,947 A | 11/1970 | Anderson |
| 3,568,590 A | 3/1971 | Grice |
| 3,623,422 A | 11/1971 | Marshall |
| D223,065 S | 3/1972 | Turner et al. |
| 3,776,127 A | 12/1973 | Muse |
| 3,938,494 A | 2/1976 | Clark |
| 4,090,490 A | 5/1978 | Riley et al. |
| 4,418,678 A | 12/1983 | Erickson |
| 4,454,805 A * | 6/1984 | Matthews ............ A47J 37/0682 99/446 |
| 4,471,751 A | 9/1984 | Hottenroth et al. |
| 4,495,860 A | 1/1985 | Hitch |
| 4,554,864 A | 11/1985 | Smith et al. |
| 4,643,162 A | 2/1987 | Collins |
| 4,677,964 A | 7/1987 | Lohmeyer et al. |
| 4,700,618 A | 10/1987 | Cox, Jr. |
| D295,136 S | 4/1988 | Cox |
| 4,770,157 A | 9/1988 | Shepherd et al. |
| 4,773,319 A | 9/1988 | Holland |
| 4,819,614 A | 4/1989 | Hitch |
| 4,823,684 A | 4/1989 | Traeger et al. |
| 5,031,602 A | 7/1991 | Vick |
| 5,163,358 A | 11/1992 | Hanagan et al. |
| D339,956 S | 10/1993 | George, Jr. |
| 5,251,607 A | 10/1993 | Traeger et al. |
| 5,253,634 A | 10/1993 | Le Beouf |
| 5,265,586 A * | 11/1993 | Salerno ............... A47J 37/0786 126/41 R |
| 5,429,110 A | 7/1995 | Burke et al. |
| 5,445,065 A | 8/1995 | Lopata |
| 5,460,159 A | 10/1995 | Bussey |
| 5,473,980 A * | 12/1995 | Carpenter ........... A47J 37/0786 126/41 R |
| 5,528,984 A | 6/1996 | Saurwein |
| D377,391 S | 1/1997 | Whitehurst |
| D381,868 S | 8/1997 | Schmitt et al. |
| 5,782,230 A | 7/1998 | Linnebur et al. |
| 6,000,389 A | 12/1999 | Alpert |
| 6,065,464 A | 5/2000 | Zajec |
| 6,102,028 A | 8/2000 | Schlosser et al. |
| D430,772 S | 9/2000 | Ganard |
| 6,173,644 B1 | 1/2001 | Krall |
| 6,189,528 B1 | 2/2001 | Oliver |
| 6,223,737 B1 | 5/2001 | Buckner |
| 6,257,130 B1 | 7/2001 | Schlosser |
| 6,263,783 B1 * | 7/2001 | Liu ..................... A47J 37/0704 99/450 |
| D447,000 S | 8/2001 | Knowles |
| D450,215 S | 11/2001 | Wood et al. |
| 6,314,871 B1 | 11/2001 | Holbrook et al. |
| 6,425,318 B1 | 7/2002 | Kim |
| 6,499,479 B1 * | 12/2002 | McLamb ............ A47J 37/0713 126/41 R |
| 6,557,545 B2 | 5/2003 | Williams |
| 6,595,197 B1 | 7/2003 | Ganard |
| 6,626,089 B1 | 9/2003 | Hubert |
| D480,259 S | 10/2003 | Pai |
| 6,640,800 B1 | 11/2003 | Hodgson et al. |
| 6,672,303 B1 | 1/2004 | Emter |
| 6,681,759 B2 | 1/2004 | Bentulan |
| D491,410 S | 6/2004 | Saunders |
| 6,821,538 B2 | 11/2004 | Axelrod et al. |
| 6,935,329 B2 * | 8/2005 | Han .................... A47J 37/0676 126/41 R |
| D535,522 S | 1/2007 | Seager |
| 7,270,122 B2 | 9/2007 | Jones |
| D562,959 S | 2/2008 | Burns |
| D577,945 S | 10/2008 | Traeger et al. |
| D578,334 S | 10/2008 | Abrahams |
| 7,469,630 B1 | 12/2008 | Ray |
| D609,045 S | 2/2010 | Bruno et al. |
| D619,237 S | 7/2010 | Arnold |
| 7,757,604 B2 | 7/2010 | Gonzalez |
| 7,793,649 B2 | 9/2010 | Barkhouse et al. |
| 7,798,139 B2 | 9/2010 | Gagas et al. |
| 7,900,553 B1 | 3/2011 | Maurin |
| D636,217 S | 4/2011 | Slater et al. |
| D646,121 S | 10/2011 | Pickard |
| 8,176,843 B2 | 5/2012 | Pliml |
| D664,806 S | 8/2012 | Peterman |
| 8,267,078 B2 | 9/2012 | Kuntz |
| D671,361 S | 11/2012 | Witzel |
| 8,381,712 B1 | 2/2013 | Simms, II |
| D680,793 S | 4/2013 | Chung |
| 8,490,614 B1 | 7/2013 | Gregory |
| 8,573,504 B1 | 11/2013 | Lee et al. |
| 8,726,896 B2 | 5/2014 | Guillory et al. |
| 8,800,542 B1 | 8/2014 | Kennington |
| 8,839,780 B1 | 9/2014 | Bennett et al. |
| 8,936,017 B2 | 1/2015 | Baggott |
| D730,103 S | 5/2015 | Manley |
| D733,483 S | 7/2015 | Baker |
| D736,026 S | 8/2015 | Kam et al. |
| 9,316,401 B1 | 4/2016 | Guste |
| 9,411,410 B2 | 8/2016 | Noda et al. |
| 9,504,354 B1 | 11/2016 | Ficarra |
| D780,302 S | 2/2017 | Merritt |
| D802,731 S | 11/2017 | Arnold |
| 9,814,354 B2 | 11/2017 | McAdams et al. |
| D825,990 S | 8/2018 | Colston |
| 10,058,105 B2 | 8/2018 | French |
| D827,368 S | 9/2018 | Colston |
| D839,047 S | 1/2019 | Colston |
| 10,201,247 B1 | 2/2019 | Jones |
| 10,213,051 B2 | 2/2019 | Colston |
| D845,071 S | 4/2019 | Colston |
| 10,292,531 B1 | 5/2019 | Hancock |
| D852,569 S | 7/2019 | Giebel et al. |
| 10,426,295 B2 | 10/2019 | McAdams et al. |
| D867,065 S | 11/2019 | Colston |
| 10,495,317 B1 | 12/2019 | Hancock |
| D871,821 S | 1/2020 | Boltz |
| 10,568,461 B2 | 2/2020 | Colston |
| 1,131,761 A1 | 4/2020 | Traeger |
| 10,674,866 B2 | 6/2020 | Colston |
| 10,694,892 B2 | 6/2020 | Colston |
| D889,201 S | 7/2020 | Measom |
| RE48,162 E | 8/2020 | Colston |
| 10,729,283 B2 | 8/2020 | McAdams et al. |
| 10,806,301 B2 | 10/2020 | Hancock |
| D901,244 S | 11/2020 | Baker |
| D903,090 S | 11/2020 | Colston |
| 10,874,252 B2 | 12/2020 | Colston |
| D907,424 S | 1/2021 | Measom |
| D913,747 S | 3/2021 | Colston |
| D915,120 S | 4/2021 | Bennion et al. |
| D915,121 S | 4/2021 | Kahn et al. |
| D920,740 S | 6/2021 | Bennion et al. |
| D921,413 S | 6/2021 | Fitzpatrick et al. |
| D927,917 S | 8/2021 | Yueh |
| D935,840 S | 11/2021 | Carter |
| D942,795 S | 2/2022 | Bevins |
| D945,208 S | 3/2022 | Duan |
| 11,259,667 B2 | 3/2022 | Colston |
| D947,589 S | 4/2022 | Czach et al. |
| D948,918 S | 4/2022 | Czach et al. |
| D953,791 S | 6/2022 | Czach et al. |
| 11,391,464 B2 | 7/2022 | Ahmed |
| D959,188 S | 8/2022 | Czach et al. |
| 2002/0017290 A1 | 2/2002 | Hines |
| 2002/0189462 A1 | 12/2002 | Guess |
| 2003/0019492 A1 | 1/2003 | Williams |
| 2004/0226550 A1 | 11/2004 | Hutton |
| 2004/0237801 A1 | 12/2004 | Starkey |
| 2005/0039612 A1 | 2/2005 | Denny |
| 2007/0028912 A1 | 2/2007 | Gagas et al. |
| 2008/0066733 A1 | 3/2008 | Wahl et al. |
| 2008/0098902 A1 | 5/2008 | Mansfield et al. |
| 2008/0121221 A1 | 5/2008 | Wang et al. |
| 2008/0271613 A1 * | 11/2008 | Lee ..................... A47J 37/0786 99/446 |
| 2009/0013985 A1 | 1/2009 | Little et al. |

(56) References Cited

U.S. PATENT DOCUMENTS

| | | |
|---|---|---|
| 2009/0320882 A1 | 12/2009 | Averwater |
| 2010/0024798 A1 | 2/2010 | Sampson |
| 2010/0083947 A1 | 4/2010 | Guillory et al. |
| 2010/0139643 A1* | 6/2010 | Pliml ............... A47J 37/0704 126/39 B |
| 2010/0218754 A1 | 9/2010 | Kuntz |
| 2011/0094494 A1 | 4/2011 | Malumyan |
| 2011/0120442 A1 | 5/2011 | Duncan |
| 2011/0219958 A1 | 9/2011 | Noble |
| 2011/0252977 A1 | 10/2011 | Sacherman |
| 2012/0251698 A1 | 1/2012 | Dennis |
| 2012/0167867 A1 | 7/2012 | Fisher et al. |
| 2012/0234308 A1 | 9/2012 | Faulk et al. |
| 2012/0276260 A1 | 11/2012 | Duncan |
| 2012/0288596 A1 | 11/2012 | Baggott |
| 2013/0000629 A1* | 1/2013 | Christopoulos ..... A47J 37/0745 126/25 AA |
| 2013/0087136 A1 | 4/2013 | Ahmed |
| 2013/0206132 A1 | 8/2013 | Simms, II |
| 2013/0213242 A1 | 8/2013 | Shippy |
| 2013/0287916 A1 | 10/2013 | Khan et al. |
| 2013/0298894 A1 | 11/2013 | Kleinsasser |
| 2013/0312732 A1 | 11/2013 | Brennan |
| 2014/0026765 A1 | 1/2014 | Fou et al. |
| 2014/0130788 A1 | 5/2014 | Contarino, Jr. |
| 2014/0290497 A1 | 10/2014 | Blomberg |
| 2014/0326232 A1 | 11/2014 | Traeger |
| 2015/0164278 A1 | 6/2015 | Kohler et al. |
| 2015/0245740 A1 | 9/2015 | Garcia |
| 2015/0265099 A1 | 9/2015 | Coffie |
| 2015/0282668 A1 | 10/2015 | Zhu |
| 2016/0255999 A1 | 9/2016 | McAdams et al. |
| 2016/0305691 A1 | 10/2016 | Sherwin |
| 2016/0327263 A1 | 11/2016 | Traeger |
| 2016/0374509 A1 | 12/2016 | Blomberg |
| 2017/0130966 A1 | 5/2017 | Barajas |
| 2017/0164783 A1 | 6/2017 | Sauerwein et al. |
| 2018/0153346 A1 | 6/2018 | Simms et al. |
| 2018/0160848 A1 | 6/2018 | Liu |
| 2018/0317707 A1 | 11/2018 | Dahle |
| 2018/0368617 A1 | 12/2018 | Allmendinger |
| 2018/0368618 A1 | 12/2018 | Measom et al. |
| 2019/0133374 A1 | 5/2019 | McAdams et al. |
| 2019/0290064 A1 | 9/2019 | Colston |
| 2019/0343331 A1 | 11/2019 | Dahle |
| 2019/0374065 A1* | 12/2019 | Hancock ............. A47J 37/0704 |
| 2020/0046163 A1 | 2/2020 | Yang et al. |
| 2020/0113382 A1 | 4/2020 | Ahmed et al. |
| 2020/0196798 A1 | 6/2020 | Boltz et al. |
| 2020/0214503 A1 | 7/2020 | Altenritter |
| 2020/0237139 A1 | 7/2020 | Colston |
| 2020/0305642 A1 | 10/2020 | Hancock |
| 2021/0196078 A1 | 7/2021 | Colston |
| 2021/0235928 A1 | 8/2021 | West et al. |
| 2022/0235940 A1 | 7/2022 | Yu |
| 2022/0279969 A1 | 9/2022 | Vandyke |
| 2022/0299207 A1 | 9/2022 | Bennett |
| 2022/0338493 A1 | 10/2022 | Ish-Hurwitz et al. |

FOREIGN PATENT DOCUMENTS

| | | |
|---|---|---|
| CN | 105125097 A | 12/2015 |
| CN | 205433271 U | 8/2016 |
| DE | 202012007425 U1 | 9/2012 |
| EP | 0809078 A2 | 11/1997 |
| EP | 898918 A1 | 3/1999 |
| EP | 2067425 | 6/2009 |
| EP | 2067425 A1 | 6/2009 |
| EP | 3375335 A1 | 9/2018 |
| JP | H03-263506 A | 11/1991 |
| JP | 2001-054473 A | 2/2001 |
| JP | 2006-118758 A | 5/2006 |
| KR | 20090027380 | 3/2009 |
| KR | 20090027380 A | 3/2009 |
| WO | 2016/138577 A1 | 9/2016 |

OTHER PUBLICATIONS

U.S. Appl. No. 17/195,488, filed Mar. 8, 2021.
U.S. Appl. No. 17/195,484, filed Mar. 8, 2021.
U.S. Appl. No. 29/773,239, filed Mar. 8, 2021.
U.S. Appl. No. 17/195,467, filed Mar. 8, 2021.
U.S. Appl. No. 29/773,227, filed Mar. 8, 2021.
U.S. Appl. No. 29/773,228, filed Mar. 8, 2021.
U.S. Appl. No. 29/773,237, filed Mar. 8, 2021.
U.S. Appl. No. 29/773,238, filed Mar. 8, 2021.
U.S. Appl. No. 16/001,921, filed Jun. 6, 2018.
International Search Report and Written Opinion mailed Jul. 13, 2022 related to PCT Application No. PCT/US2022/70986.
International Search Report and Written Opinion mailed Jul. 13, 2022 related to PCT Application No. PCT/US2022/70989.
International Search Report and Written Opinion mailed Jul. 11, 2022, in related PCT Application No. PCT/US2022/070987.
Decision Denying Institution of Inter Partes Review of U.S. Pat. No. 10,292,531 (IPR2022-01467), dated Mar. 22, 2023. 34 pages.
International Search Report and Written Opinion, as issued in connection with International Patent Application No. PCT/US2019/035005, dated Oct. 11, 2019, 18 pgs.
International Search Report and Written Opinion, as issued in connection with International Patent Application No. PCT/US2020/025597, dated Sep. 23, 2020, 17 pgs.
International Preliminary Report, as issued in connection with International Patent Application No. PCT/US2020/025597, dated Sep. 28, 2021, 10 pgs.
Chinese Office Action, as issued in connection with Chinese Application No. 2019800380618, dated Aug. 18, 2021, 8 pgs.
European Search Report, as issued in connection with European Application No. 19815138.3, dated Feb. 10, 2022, 10 pgs.
Cabela's 7-in-1 Smoker: Features; Published on Mar. 24, 2015; Masterbuilt; available at: https://www.youtube.com/watch?v=EmoxdiarVw.
Exclusive Review—American Muscle Grill—Mutli Fuel—Gas, Charcoal, Wood, or Pellet—BBQGuys.com; Published on Dec. 8, 2015; BBQGuys.com; available at: https://www.youtube.com/watch?v=wyQ5UVv0Tq4.
Five Reasons to Buy a Vision Grill; Published on May 24, 2013; videosolutions; available at: https://www.youtube.com/watch?v=mkO19Eahp7E.
Pit Boss Memphis Ultimate; Published on Jan. 28, 2018; Pit Boss Grills; available at: https://www.youtube.com/watch?v=HGm7Q6HhKyM.
Rick Bayless Explains the Kalamazoo Hybrid Grill; Published on Dec. 21, 2016; SurLaTableCorp; available at: https://www.youtube.com/watch?v=eT-IBAYLHZY.
Non-Final Office Action mailed Mar. 14, 2023; U.S. Appl. No. 17/195,477.
International Search Report and Written Opinion mailed Jul. 8, 2022 related to PCT Application No. PCT/US2022/070985.
*Lifetime Products, Inc. v. Logan Outdoor Products, LLC*, Inter Partes Review No. Unassigned, Petition For Inter Partes Review of U.S. Pat. No. 10,292,531, filed Aug. 25, 2022 (114 pgs.).
U.S. Appl. No. 17/327,235, filed May 21, 2021.
*Lifetime Products, Inc. V. Logan Outdoor Products, LLC*, Civil Case No. 1:21-cv-00156-DBP, Memorandum Decision and Order Granting Defendant's Motion To Stay Pending Inter Partes Review (Doc. No. 69) 10 Pages.
Allthingsbbq, Yoder Smokers YS640 Pellet Smoker, Dec. 2, 2013, Youtube, Https://www.youtube.com/watch?v=_ NC4Sdj3R4 (Year:2013).
Camp Chef 36 Inch Pellet Grill & Smoker, Nov. 18, 2019, Amazon, https://www.amazon.com/Camp-Chef-Woodwind-Pellet-Smoker/dp/B081NSWWVV (Year: 2019).

(56) References Cited

OTHER PUBLICATIONS

Dyna-Glo Dual Chamber Charcoal Grill, May 22, 2018, Amazon, https://www.amazon.com/Dyna-Glo DGN576SNC-D-Premium-Charcoal-Stainless/DP/B00BQ59VTE (Year: 2018).
Masterbuilt Gravity Series, Oct. 4, 2020, Amazon, https://www.amazon.com/Masterbuilt-MB20041220-Gravity-Digital-Charcoal/dp/B0851FJM4D (Year: 2020).
Non-Final Office Action mailed Oct. 4, 2022; U.S. Appl. No. 16/833,589.
U.S. Appl. No. 18/667,816, filed May 17, 2024.
International Search Report and Written Opinion mailed Sep. 10, 2024 in related PCT Application No. PCT/US2024/030127.

* cited by examiner

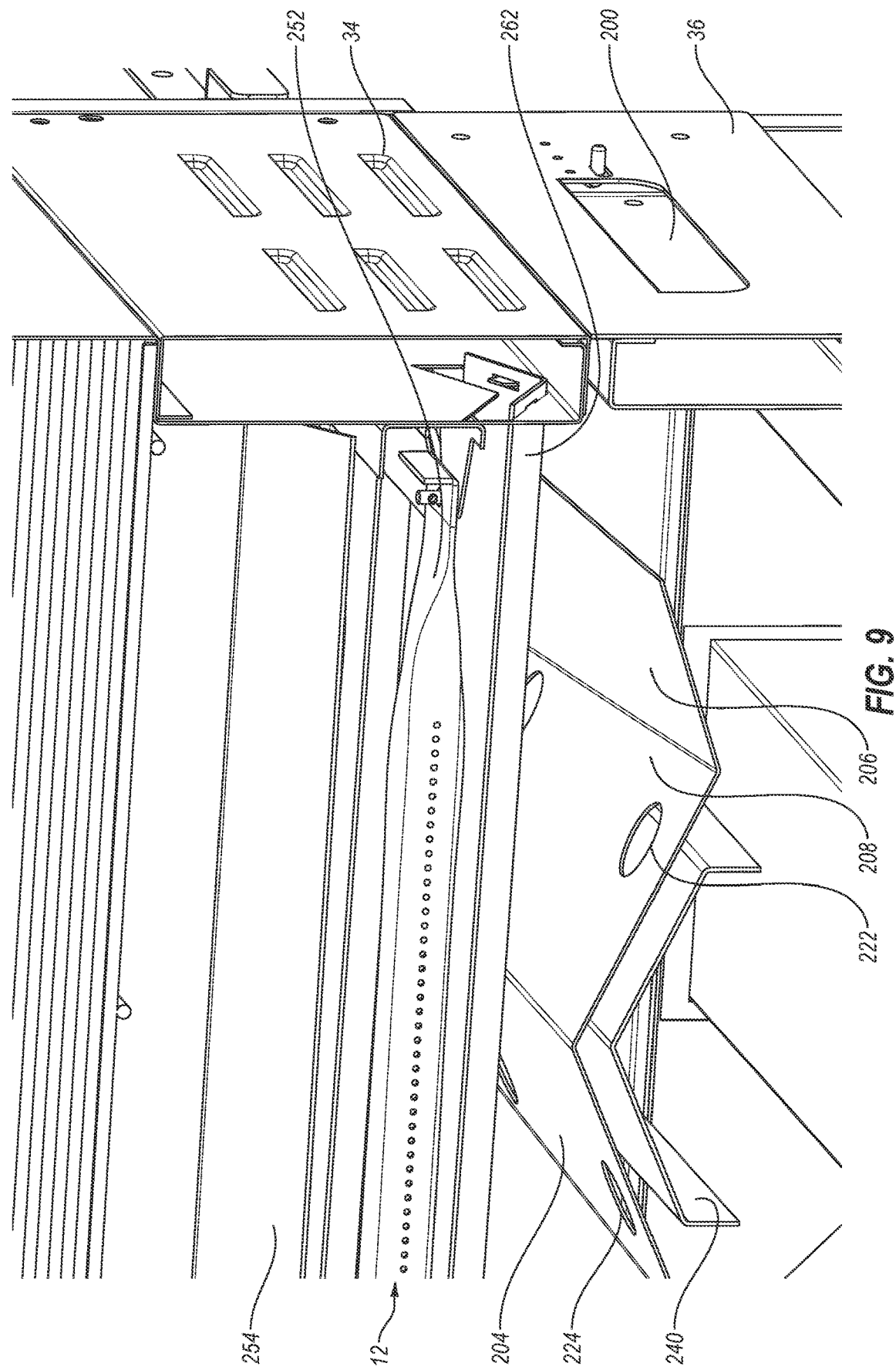

DRIP TRAY FOR A COOKING DEVICE

BACKGROUND

Field

This disclosure generally relates to an apparatus and method for cooking food products and, more particularly, to an apparatus and/or method that cooks food products by grilling and/or smoking, such as a combination gas powered grill and smoker.

Description of Related Art

Outdoor appliances have been used to cook food and perform other tasks. For example, outdoor appliances such as barbeque grills are often used to cook meats, vegetables, fruits, and other types of food. A barbeque grill typically cooks food by applying heat directly below a grill. Many barbeque grills are gas fueled, and propane or natural gas is typically used as a fuel source.

Wood pellet-burning barbecues are also popular for outdoor cooking. Conventional wood pellet-burning barbecues often employ a motor-driven auger to feed wood pellets into a combustion area where the pellets are burned to provide heat and smoke to cook the food products. Wood pellet-burning barbecues may be used for cooking food at relatively low temperature over a long period of time. Wood pellet-burning barbecues, which may be referred to as smokers, may provide a particular taste imparted to the food products because of the smoke.

Some known cooking devices may be configured for using multiple types of fuels. These cooking devices may have two single-fuel type cooking devices manufactured into a single device. For instance, a duel-fuel cooking device may include a gas grill that is positioned next to a charcoal grill, and manufactured into a single device. Such configurations are generally large compared to single-fuel type cooking devices and do not improve the functionality of the cooking device. Instead, these cooking devices merely provide a fuel option. Moreover, these duel-fuel type cooking devices may include two separate cooking areas. Accordingly, these duel-fuel type cooking devices are often bulky, complicated structures that require a large amount of space.

Traditional barbeque grills often have uneven heat distribution. For example, one portion of the grill may be significantly hotter than another portion of the grill. Thus, there may be significant temperature differences, which may result in uneven cooking. In addition, some grills include an exhaust port to allow the release smoke or heat. Known barbeque grills often release the smoke and heat before they can be used efficiently. For instance, heated smoke may rise to the top of the grill and the smoke may be released through the exhaust port before it can infuse flavor into the food product. Heat may also be released before it can be used efficiently to cook the food product.

Barbeque grills are typically operated using manual controls. For example, many conventional gas fueled barbeque grills have an ignition button that, when pressed, generates a spark near a gas outlet on a burner. The spark ignites the gas and the burner begins to create heat. The amount of heat is generally controlled using a dial or knob that allows more or less gas to be supplied to the burner. In some cases, the barbeque grill may have electronic controls. Thus, instead of having a manual dial to adjust the amount of gas being introduced at the burner, an electronic control is set or adjusted by the user. The electronic control then interacts with a solenoid or other electro-mechanical component to regulate the flow of gas to the burner.

Wood pellet-burning barbecues may be operated by manual controls in which the user controls the number of pellets provided to a combustion area. Wood pellet-burning barbecues may also use an electronic temperature control system that is set by a user so that a desired temperature is maintained. Known wood pellet-burning barbeques often provide uneven heat and/or smoke generation, and have significant temperature differences within the cooking area and on the cooking surface. Conventional wood pellet-burning barbeques also often do not maintain a constant temperature within the cooking area and use more fuel than necessary because of the various inefficiencies.

The subject matter claimed herein is not limited to embodiments that solve any disadvantages or that operate only in environments such as those described. Rather, this background is only provided to illustrate one example technology area where some embodiments described herein may be practiced.

BRIEF SUMMARY

A need therefore exists for a cooking device that eliminates or diminishes one or more of the above-described disadvantages and problems.

One aspect is a cooking device that may allow grilling and/or smoking of foodstuffs in the same cooking chamber. For example, the foodstuffs may be grilled by a gas-powered heat source, and smoked by a wood pellet burner. The first and second heat sources may be used independently and/or concurrently.

Another aspect is a cooking device that may include a housing, a cooking chamber, a cooking structure, a first heat source, a second heat source, and/or a baffle. The baffle may be disposed between the first heat source and the second heat source. The baffle may be sized and configured to facilitate distribution of heat and/or smoke within the cooking chamber. For example, the baffle may be sized and configured to facilitate distribution of heat and/or smoke from the second heat source. In an exemplary embodiment, the baffle may be configured to direct at least a portion of the thermal energy produced by the second heat source to one or more outer portions of the cooking chamber. The baffle may form at least a portion of a drip tray and the drip tray may be configured to collect dripping from foodstuffs during operation of the cooking device. A diffuser or heat shield, which may be connected to the baffle, may redirect and/or more evenly distribute thermal energy and/or smoke from the second heat source.

Still another aspect is a cooking device that may include a single cooking chamber that is heated by the first heat source and/or the second heat source. The cooking chamber may include one or more cooking structures with one or more cooking surfaces, and the cooking structures may be sized and configured for placement of foodstuffs. The first heat source may be sized and configured to heat the cooking structure via convection such that the cooking structure provides thermal energy via conduction to foodstuffs placed on the cooking surface. The first heat source may also provide heat directly to the foodstuffs. For example, if the cooking structure is a grill or grate, heat from the first heat source may directly heat at least a portion of the foodstuffs. The first heat source may be configured to combust a first type of fuel and may provide direct heating to the foodstuffs. The second heat source may be configured to combust a second fuel type and may provide indirect heating to the foodstuffs. The first heat source and the second heat source may be usable independently and/or concurrently. This may allow the single cooking chamber to be heated by the first heat source, the second heat source, and/or a combination of the first heat source and the second heat source.

Advantageously, the first and second heat sources may be disposed in a single, integrated structure, such as a cooking chamber or cooking volume. This may allow the cooking device to cook foodstuffs by different methods, different types of heating, different types of fuels, and/or a combination thereof. For example, the cooking device may allow the same cooking chamber to be used for grilling via a gas-powered grill and/or smoking via a wood pellet-burning smoker. Thus, instead of using one structure or apparatus for grilling and a different structure or apparatus for smoking, the disclosed cooking device may allow the same cooking chamber to be used for grilling and/or smoking foodstuffs.

Yet another aspect is a cooking device that may have different types of heating sources disposed in a vertically disposed or stacked arrangement. For example, the cooking device may include an enclosure, a cooking chamber, a cooking structure, a gas-powered heat source, a wood pellet burning heat source, and/or a baffle. The cooking chamber may be a single cooking volume and the cooking structure may be disposed within the cooking chamber. The cooking structure may include one or more cooking surfaces and the cooking surfaces may be configured for placement of foodstuffs. At least a portion of the gas-powered heat source may be positioned in a lower portion of the housing and the gas-powered heat source may be arranged to directly heat at least substantially all the cooking structure. The wood pellet-burning heat source may be positioned below the gas-powered heat source, and the wood pellet-burning heat source may provide heat and/or smoke to the cooking chamber. The gas-powered heat source and the wood pellet-burning heat source may be usable independently and/or usable concurrently.

The first heat source may be better suited for high-heat cooking processes and the second heat source may be better suited for low-heat cooking processes. Thus, the cooking device may enable high-heat and/or high-temperature operations by the first heat source, and low-heat and/or low temperature operations by the second heat source. The cooking device may enable cooking operations that involve both heat sources, and these cooking operations may occur autonomously and/or concurrently. These cooking operations may be controlled by a user, one or more electronic controls such as a controller, and/or both the user and the controller.

Still another aspect is a cooking device that may include a first heat source that provides a particular heating function, such as the emission of a first thermal energy. The first thermal energy may be emitted and directly distributed across to most or at least substantially all of the cooking structure and/or cooking surfaces. The first heat source may be a gas-powered grill that provides a large thermal output, which may allow foodstuffs to be warmed, heated, and/or cooked relatively quickly. The second heat source may provide a second thermal energy. The second heat source may provide a low thermal output and may indirectly heat foodstuffs disposed in the cooking chamber. The second heat source may combust solid fuels such as pelletized fuels, wood pellets, biomass, and the like. Thus, the first heat source may have a high thermal output, may directly provide thermal energy to the cooking surface and/or cooking structure, may directly provide thermal energy to the foodstuffs, and/or may quickly heat, prepare, and/or cook the foodstuffs. On the other hand, the second heat source may have a low thermal output, may indirectly provide thermal energy to the cooking surface and/or cooking structure, may indirectly provide thermal energy to the foodstuffs, and/or may slowly heat, prepare, or cook the foodstuffs.

A further aspect is a cooking device that may include one or more control systems. The control systems may control the different types of fuels and/or different types of heat sources. For example, a first heat control system may be configured to control a first heat source and a second heat control system may be configured to control the second heat source. The control systems may allow the cooking device to be configured for multiple operations. For instance, the control systems may allow the first and second heat sources to operate independently and/or cooperatively, which may allow for cooking of foodstuffs with direct thermal energy from the first heat source and/or indirect thermal energy from the second heat source. It will be appreciated that the same control system may control both heat sources, and the cooking device may include any suitable number of control systems.

Another further aspect is a cooking device that may include a control system that controls the first heat source and the second heat source. The control system may allow a more constant or uniform temperature to be maintained within the cooking chamber. The control system may facilitate different types of cooking and may allow desired temperatures within the cooking chamber to be reached more quickly and efficiently. The control system may communicate with one or more sensors, such as temperature probes or thermocouples, to control, for example, the temperature within the cooking chamber. The control system may also provide control over other functions and features, such as heat profiles, cooking parameters, smoke generation, etc. The control system may manage the cooking processes in such a way that selected temperatures are obtained more efficiently and/or quickly. The control system may also help ensure the appropriate heat sources are used, the desired amount of smoke is provided, and the like.

A still further aspect is a cooking device that may provide more uniform heat and/or smoke distribution. For example, the cooking device may include one or more structures to facilitate distribution of heat and/or smoke within a cooking chamber. In an exemplary embodiment, one or more baffles may be sized and configured to direct heat and/or smoke within the cooking chamber. The baffles may include one or more holes or apertures, and the holes may be sized and configured to facilitate heat and/or smoke distribution within the cooking chamber. The cooking device may also include one or more circulation devices, which may be adapted for efficiently circulating heat and/or smoke within the cooking chamber. For instance, the cooking device may include a chimney and the chimney may be sized and configured to facilitate heat and/or smoke distribution within the cooking chamber. The chimney may allow heat and/or smoke to exit the cooking chamber in a controlled matter. The chimney may have a substantially vertical configuration and may be size and configured to facilitate more even heating and/or more uniform circulation within the cooking chamber.

Advantageously, the cooking device may provide increased functionality and potential uses because different types of pellets and different types of fuels may afford different flavors and cooking methods to be used. For example, the cooking device may allow foodstuffs to be grilled and/or smoked, and the foodstuffs may be grilled and/or smoked for different times and in different orders or sequences. Thus, foodstuffs may have different tastes, flavoring, textures, and the like depending, for example, if the foodstuffs are grilled and/or smoked. Also, a controller or control system may provide increased efficiency and/or precision during the cooking process. In addition, the cooking device may be more easily cleaned and/or sanitized because of the high heat provided by the gas-powered burner system in comparison to the wood pellet-burning system.

Another aspect is a cooking device that may include a single cooking chamber; a cooking structure may be disposed within the cooking chamber, the cooking structure may include one or more cooking surfaces configured for placement of foodstuffs; a first heat source may be at least partially disposed within the cooking chamber, the first heat source may include a gas-powered heat source with one or more burners disposed in the cooking chamber; a second heat source may be at least partially disposed within the cooking chamber, the second heat source may include a burn pot sized and configured to burn a solid fuel, the burn pot of the second heat source may be disposed below the burners of the first heat source in a vertically stacked configuration; and a drawer may be movable between an open position and a closed position relative to the cooking chamber, the drawer may including a drip tray that is disposed between the burners of the first heat source and the burn pot of the second heat source when the drawer is in the closed position, the drawer may allow the drip tray to be at least partially removed from between the burners of the first heat source and the burn pot of the second heat source when the drawer is in the open position.

The cooking device may include a drawer that is removable from the cooking chamber; the drawer may allow the drip trip to be cleaned without moving, removing, or opening other components of the cooking device other than the drawer; the drawer may be disposed in an opening in a rear surface of the cooking device; the drawer may at least substantially form a seal with the cooking chamber when the drawer is in the closed position; and/or the drawer may slide in and out of an opening in the cooking chamber when the drawer is moved between the open and closed positions. The cooking device may include a diffuser connected to a lower portion of the drip trip, and the diffuser may be at least partially disposed above the burn pot of the second heat source. The cooking device may include a burn pot of the second heat source generally disposed in a first plane; the drawer may be generally disposed in a second plane when the drawer is in the closed position; the burners of the first heat source may be generally disposed in a third plane; the first plane, the second plane, and the third plane may be generally disposed in a vertically stacked configuration; and the first plane, the second plane, and the third plane may be generally disposed in a parallel configuration. The cooking device may include a burn pot of the second heat source generally disposed in a first plane; the drawer may be generally disposed in a second plane when the drawer is in the closed position; the burners of the first heat source may be generally disposed in a third plane; at least a portion of the cooking structure may be generally disposed in a fourth plane; the first plane, the second plane, the third plane, and the fourth plane may be generally disposed in a vertically stacked configuration; and the first plane, the second plane, the third plane, and the fourth plane may be generally disposed in a parallel configuration.

The cooking device may include a drawer that is disposed generally parallel to the cooking structure when the drawer is disposed in the closed position. The cooking device may include a first gap disposed between the drip tray and a front portion of the drawer, the first gap may be sized and configured to allow at least a portion of the thermal energy from the second heat source to flow towards the cooking structure. The cooking device may include a second gap disposed between the drip tray and a rear portion of the cooking chamber, the second gap may be sized and configured to allow at least a portion of the thermal energy from the second heat source to flow towards the cooking structure. The cooking device may include a second gap disposed between a rear portion of the drawer and a rear portion of the cooking chamber, the second gap may be sized and configured to allow at least a portion of the thermal energy from the second heat source to flow towards the cooking structure. The cooking device may include a drawer that at least substantially extends between a first side of the cooking chamber and a second side of the cooking chamber; and the drawer may at least substantially extend between a front portion of the cooking chamber and a rear portion of the cooking chamber. The drawer may include a front panel, the front panel may form a portion of the cooking chamber when the drawer is in the closed position, and the front panel may be sized and configured to retain heat within the cooking chamber during use of the cooking device. The drawer may form a portion of a heat and/or smoke distribution system within the cooking chamber, the heat and/or smoke distribution system may be sized and configured to direct at least a portion of the thermal energy and/or smoke produced by the second heat source towards the cooking structure. The heat and/or smoke distribution system may include one or more gaps disposed about one or more edges of the drip tray and one or more openings in the drip tray.

Still another aspect is a cooking device that may include a single cooking chamber; a cooking structure may be disposed within the cooking chamber, the cooking structure may include one or more cooking surfaces configured for placement of foodstuffs; a first heat source may be at least partially disposed within the cooking chamber, the first heat source may include a gas-powered heat source with one or more burners disposed in the cooking chamber; a second heat source may be at least partially disposed within the cooking chamber, the second heat source may include a burn pot sized and configured to burn a solid fuel, the burn pot of the second heat source may be disposed below the burners of the first heat source in a vertically stacked configuration, the second heat source may be sized and configured to provide thermal energy indirectly to the cooking structure; an opening may be disposed in the cooking chamber; a drawer may be movable within the opening in the cooking chamber between an open position and a closed position; and a drip trip may be connected to the drawer, the drip tray may be disposed between the burners of the first heat source and the burn pot of the second heat source when the drawer is in the closed position, the drip tray may be at least partially removed from between the burners of the first heat source and the burn pot of the second heat source when the drawer is in the open position. The cooking device may include a heat and/or smoke distribution system disposed within the cooking chamber, the heat and/or smoke distribution system may at least partially control the flow of heat and/or smoke from the second heat source towards the cooking structure, the heat and/or smoke distribution system may include one or more gaps disposed about one or more edges of a drip tray and one or more openings in the drip tray.

Yet another aspect is a cooking device that may include a single cooking chamber; a cooking structure disposed within the cooking chamber, the cooking structure may include one or more cooking surfaces configured for placement of foodstuffs; a first heat source may be at least partially disposed within the cooking chamber, the first heat source may include a gas-powered heat source with one or more burners disposed in the cooking chamber; a second heat source may be at least partially disposed within the cooking chamber, the second heat source may include a burn pot sized and configured to burn a solid fuel; an opening may be disposed in an outer wall of the cooking chamber; a drip tray may be slidably disposed within the opening in the outer wall of the cooking chamber, the drip tray may be movable between a first position and a second position, the first position may include the drip tray disposed between the burners of the first heat source and the burn pot of the second heat source, the second position may include the drip tray at least partially removed from between the burners of the first heat source and the burn pot of the second heat source; and a heat and/or smoke distribution system may be disposed within the cooking chamber, the heat and/or smoke distribution system may be sized and configured to direct at least a portion of the heat and/or smoke produced by the second heat source towards the cooking structure, the heat and/or smoke distribution system may include one or more gaps disposed about one or more edges of the drip tray and one or more openings in the drip tray.

Another aspect is a drip tray for a cooking device that may include a first portion; a second portion, the first portion and the second portion may be disposed in a generally V-shaped configuration; a third portion; and a fourth portion, the third portion and the fourth portion may be disposed in a generally V-shaped configuration. The drip tray may include the second portion and the third portion disposed in a generally inverted V-shaped configuration. The drip tray may include a lower portion of the first portion and the second portion that is sloped towards a first aperture; and a lower portion of the third portion and the fourth portion that is sloped towards a second aperture. The lower portion of the first portion and the second portion may facilitate drippings from foodstuffs to traverse the sloped portion, pass through a first aperture, and enter a collection system that collects the drippings; and the lower portion of the third portion and the fourth portion may facilitate drippings from foodstuffs to traverse the sloped portion, pass through a second aperture, and enter the collection system that collects the drippings. The lower portion of the first portion and the second portion may be sloped in a first direction; and the lower portion of the third portion and the fourth portion may be sloped in a second direction. In an exemplary embodiment, the first direction and the second direction may be generally the same direction.

The drip tray may form at least a portion of a heat and/or smoke ventilation system; and the drip tray may include one or more opening that are sized and configured to facilitate heat and/or smoke distribution within a cooking device as part of the heat and/or smoke ventilation system. The one or more openings in the drip tray may comprise one or more openings in a first portion of the drip tray and one or more openings in a second portion of the drip tray. The one or more openings in the drip tray may comprise one or more openings in the second portion of the drip tray and one or more openings in the third portion of the drip tray. The one or more openings in the second portion of the drip tray may comprise a first plurality of openings generally aligned along a first axis; the one or more openings in the third portion of the drip tray may comprises a second plurality of openings generally aligned along a second axis; and the first plurality of openings generally aligned along the first axis may be disposed generally parallel to the second plurality of openings generally aligned along the second axis. The one or more openings in the second portion of the drip tray may be spaced a generally equidistance apart; and the one or more openings in the third portion of the drip tray may be spaced a generally equidistance apart. The drip tray may be slidable within an opening in a sidewall of a cooking device, the drip tray may be movable between a first position in which the drip tray is inserted into the cooking device through the opening and a second position in which the drip is removed from the cooking device through the opening. The drip tray may include a diffuser attached to a lower surface of the drip tray.

Still another aspect is a cooking device including a cooking chamber; a cooking structure disposed within the cooking chamber, the cooking structure including one or more cooking surfaces configured for placement of foodstuffs; and a drip tray disposed within the cooking chamber. The drip tray may include a first portion; a second portion, the first portion and the second portion being disposed in an angled configuration; a third portion; and a fourth portion, the third portion and the fourth portion being disposed in an angled configuration. The cooking device may include a gas heat source at least partially disposed within the cooking chamber, the gas heat source may include one or more burners disposed in the cooking chamber; and a solid fuel heat source at least partially positioned within the cooking chamber, the solid fuel heat source may include a burn pot disposed below the burners of the gas heat source, the gas heat source and the solid fuel heat source may be disposed in a vertically stacked configuration.

A drip tray may be at least partially disposed between the gas heat source and the solid fuel heat source. The drip tray may be sized and configured to control at least a portion of a flow of thermal energy produced by the solid fuel heat source towards the cooking structure. The drip tray may be sized and configured to facilitate distribute of heat and/or smoke from the solid fuel heat source. The drip tray may be sized and configured to collect fluids dripping from foodstuffs placed on the cooking structure, a lower portion of the first portion and the second portion of the drip tray may be angled such that the fluids proceed down the angled portion and exit the cooking chamber via a collection system, a lower portion of the third portion and the fourth portion of the drip tray may be angled such that the fluids proceed down the angled portion and exit the cooking chamber via the collection system. The drip tray may be connected to a drawer and the drawer may be movable between an open position and a closed position relative to the cooking chamber. The drawer may allow the drip tray to be at least partially removed from the cooking chamber when the drawer is in the open position. The drawer may be sized and configured to be slidably disposed within an opening of the cooking chamber, the drawer may slide in and out of the opening in the cooking chamber when the drawer is moved between the open and closed positions; and the drawer may be removable to allow the drip tray to be removed from the cooking device. The drip tray may at least substantially extend between a first side of the cooking chamber and a second side of the cooking chamber; a first gap may be disposed between a front portion of the drip tray and a front portion of the cooking chamber; and a second gap may be disposed between a rear portion of the drip tray and a rear portion of the cooking chamber. The drip tray may form at least a portion of a heat and/or smoke distribution system within the cooking chamber; the heat and/or smoke distribution system may at least partially control a flow of heat and/or smoke from a solid fuel heat source towards the cooking structure; and the drip tray may include one or more openings as part of the heat and/or smoke distribution system.

Another aspect is a heat and/or smoke distribution system for a cooking device that may include two different fuel systems to warm, prepare, and/or cook foodstuffs. The heat and/or smoke distribution system may include a single cooking chamber; a cooking structure may be disposed within the cooking chamber, the cooking structure may include one or more cooking surfaces configured for placement of foodstuffs; a gas heat source may be at least partially disposed within the cooking chamber, the gas heat source may include one or more burners disposed within the cooking chamber, the gas heat source may be sized and configured to provide thermal energy directly to the cooking structure; a solid fuel heat source may be at least partially disposed within the cooking chamber, the solid fuel heat source may include a burn pot disposed below the one or more burners, the gas heat source and the solid fuel heat source may be disposed in a vertically stacked configuration, the solid fuel heat source may be sized and configured to provide thermal energy indirectly to the cooking chamber; a diffuser may be disposed between the solid fuel heat source and the gas heat source; and a drip tray may be disposed between the solid fuel heat source and the gas heat source, the drip tray may include one or more openings to control the flow of heat and/or smoke from the solid fuel source towards the cooking structure.

The heat and/or smoke distribution system may include one or more gutters disposed beneath the one or more burners. The one or more gutters may be sized and configured to collect unburned gas from the one or more burners and vent the unburned gas outside the cooking chamber. The one or more gutters may be sized and configured to direct heat from the solid fuel heat source away from the one or more burners of the gas heat source. The heat and/or smoke distribution system may include one or more gutters disposed beneath the one or more burners; and one or more heat tents disposed above the one or more burners; the one or more gutters and the one or more heat tents may at least partially enclose the one or more burners; the one or more gutters may be sized and configured to collect unburned gas from the one or more burners and vent the unburned gas from the cooking chamber; the one or more gutters may be sized and configured to direct heat from the solid fuel heat source away from the one or more burners of the gas heat source; and the one or more heat tents may be sized and configured to direct heat from the gas heat source towards the cooking structure. A flow of heat and/or smoke from the solid fuel heat source towards the cooking structure may be at least partially controlled by the diffuser, the drip tray, and the gutters. The heat and/or smoke distribution system may include one or more of vents in a rear portion of the cooking chamber, and the vents may be sized and configured to allow heat and/or smoke to exit the cooking chamber. The heat and/or smoke distribution system may include a chimney disposed in a lid, the lid may be movable between an open position and a closed position, the lid may form a portion of the cooking chamber when the lid is in the closed position, and the chimney may provide ventilation for the gas heat source and the solid fuel heat source. The diffuser may be at least partially disposed above the burn pot of the solid fuel source; and the diffuser may be sized and configured to redirect heat and/or smoke from the solid fuel system towards one or more sides of the cooking chamber. The heat and/or smoke distribution system may include a first gap disposed between the drip tray and a first portion of the cooking chamber, the first gap may be sized and configured to allow at least a portion of the thermal energy produced by the solid fuel heat source to flow towards a first outer portion of the cooking chamber. The heat and/or smoke distribution system may include a second gap disposed between the drip tray and a second portion of the cooking chamber, the second gap may be sized and configured to allow at least a portion of the thermal energy produced by the solid fuel heat source to flow towards a second outer portion of the cooking chamber.

The heat and/or smoke distribution system may include a first gap disposed between the drip tray and a first portion of the cooking chamber, the first gap may be sized and configured to allow at least a portion of the thermal energy produced by the solid fuel heat source to flow towards a first outer portion of the cooking chamber; and a second gap may be disposed between the drip tray and a second portion of the cooking chamber, the second gap may be sized and configured to allow at least a portion of the thermal energy produced by the solid fuel heat source to flow towards a second outer portion of the cooking chamber. The one or more openings in the drip tray may comprise a first plurality of openings that is sized and configured to allow at least a portion of the thermal energy produced by the solid fuel heat source to flow towards the cooking chamber; and the one or more openings in the drip tray may comprise a second plurality of openings that is sized and configured to allow at least a portion of the thermal energy produced by the solid fuel heat source to flow towards the cooking chamber. The gas heat source may provide thermal energy at least partially via conduction to foodstuffs placed on the cooking structure; one or more gutters may be disposed below the one or more burners; the solid fuel heat source may provide thermal energy to the cooking chamber at least partially via convection; and a flow of heat and/or smoke from the solid fuel heat source towards the cooking structure may be at least partially controlled by the diffuser, the drip tray, and the one or more gutters.

The gas heat source may include a gas-powered grill; the solid fuel heat source may include pelletized fuel that is fed to the burn pot via a feed system; the cooking chamber may be sized and configured for high heat processes from the gas heat source, low heat processes from the solid fuel heat source, direct heating from the gas heat source, indirect heating from the solid fuel heat source, and smoke from the sold fuel heat source; and ventilation of the cooking chamber during use of the gas heat source and/or the solid fuel heat source may be provided by a chimney. The cooking chamber may be sized and configured for cooking with high heat using the gas heat source; cooking with low heat using from the solid fuel heat source; direct heating using the gas heat source; indirect heating using the solid fuel heat source; receiving smoke from the sold fuel heat source; and ventilation of the cooking chamber during use of the gas heat source and/or the solid fuel heat source may be provided by a chimney. The heat and/or smoke distribution system may include one or more vents in a rear portion of the cooking chamber.

Yet another aspect is a heat and/or smoke distribution system for a cooking device that may include two different fuel systems to warm, prepare, and/or cook foodstuffs. The heat and/or smoke distribution system may include a housing; a cooking chamber disposed within the housing; a cooking structure disposed within the cooking chamber, the cooking structure including one or more cooking surfaces configured for placement of foodstuffs; a gas heat source may be at least partially disposed within the cooking chamber, the gas heat source may include one or more burners disposed within the cooking chamber, the gas heat source may provide thermal energy directly to at least a portion of the cooking structure; a solid fuel heat source may be at least partially disposed within the cooking chamber, the solid fuel heat source may include a burn pot disposed below the one or more burners of the gas heat source, the solid fuel heat source may provide thermal energy indirectly to the cooking chamber; a diffuser may be disposed between the solid fuel heat source and the gas heat source; a drip tray may be disposed between the solid fuel heat source and the gas heat source, the drip tray may include one or more openings to control the flow of heat and/or smoke from the solid fuel source towards the cooking structure; and one or more gutters may be disposed beneath the one or more burners, the one or more gutters may be sized and configured to direct heat from the solid fuel heat source away from the one or more burners of the gas heat source; wherein a flow of heat and/or smoke from the solid fuel heat source towards the cooking structure may be at least partially controlled by the diffuser, the drip tray, and the one or more gutters. The heat and/or smoke distribution system may include one or more vents in a rear portion of the housing. The heat and/or smoke distribution system may include a first gap disposed between the drip tray and a first portion of the cooking chamber, the first gap may be sized and configured to allow at least a portion of the heat and/or smoke produced by the solid fuel heat source to flow towards a first outer portion of the cooking chamber. The heat and/or smoke distribution system may further include a second gap disposed between the drip tray and a second portion of the cooking chamber, the second gap may be sized and configured to allow at least a portion of the thermal energy produced by the solid fuel heat source to flow towards a second outer portion of the cooking chamber.

Another aspect is a combination gas-powered grill and pellet-burning smoker that may include an enclosure and a plurality of components may be disposed in a plurality of levels within the enclosure. The plurality of components may be disposed in a vertically stacked configuration. The plurality of components may include a burn pot disposed in a first level, the burn pot may be sized and configured for combustion of pelletized fuel, the burn pot may be part of a solid fuel heat source; a diffuser may be disposed in a second level, the second level may be at least partially disposed above the first level, the diffuser may be sized and configured to diffuse thermal energy from the burn pot towards one or more sides of the enclosure; a drip tray may be disposed in a third level, the third level may be at least partially disposed above the second level, the drip tray may include one or more openings that facilitate a flow of heat and/or smoke from the solid fuel heat source; one or more gutters may be disposed in a fourth level, the fourth level may be at least partially disposed above the third level; one or more burners may be disposed in a fifth level, the fifth level may be at least partially disposed above the fourth level, the burners may be part of a gas-powered heat source; one or more heat tents may be disposed in a sixth level, the sixth level may be at least partially disposed above the fifth level; and a grilling surface may be disposed in a seventh level, the seventh level may be at least partially disposed above the sixth level.

The combination gas-powered grill and pellet-burning smoker may include a cooking chamber, and the burn pot, the diffuser, the drip tray, the one or more gutters, the one or more burners, the one or more heat tents, and/or the grilling surface may be disposed within the cooking chamber. The grilling surface may be sized and configured to receive direct heat from the gas-powered heat source and indirect heat from the solid fuel heat source; and the drip tray may be sized and configured to direct at least a portion of the thermal energy from the solid fuel heat source towards the one or more sides of the enclosure. The burn pot may be generally centrally disposed within the enclosure; the diffuser may be at least partially vertically aligned with the burn pot; the drip tray may be removable through an opening in a rear wall of the enclosure; and the one or more gutters may be disposed below the one or more burners. The openings in the drip tray may be sized and configured to facilitate a flow of thermal energy and/or smoke from the solid fuel heat source towards the grilling surface. The levels may be sequentially disposed in the vertically stacked configuration from the first level to the seventh level. The diffuser may direct heat and/or smoke from the solid fuel heat source towards the one or more sides of the enclosure; and the one or more openings in the drip tray may direct heat and/or smoke from the solid fuel source towards the grilling surface. The one or more gutters may be sized and configured to direct heat and/or smoke away from the one or more burners of the gas-powered heat source. The one or more gutters may be sized and configured to direct heat and/or smoke from the solid fuel source towards the grilling surface. The one or more openings in the drip tray may facilitate the flow of heat and/or smoke from the solid fuel source towards the grilling surface. The diffuser may direct heat and/or smoke from the solid fuel heat source towards the one or more sides of the enclosure; and one or more gaps may be disposed between the drip tray and the one or more sides of the enclosure, the one or more gaps may be sized and configured to allow heat and/or smoke from the solid fuel source to flow towards the grilling surface The one or more openings in the drip tray may comprise a first plurality of openings and a second plurality of openings, at least some of the openings in the first plurality of openings may have generally the same size, generally the same shape, and spaced apart by a generally constant distance, at least some of the openings in the second plurality of openings may have generally the same size, generally the same shape, and spaced apart by a generally constant distance; and the first plurality of openings and the second plurality of openings may be sized and configured to facilitate the flow of heat and/or smoke from the solid fuel source towards the grilling surface.

Still another aspect is a cooking device that may include a housing; a first level may be disposed within the housing, the first level may include a burn pot for a solid fuel heat source; a second level may be disposed within the housing, the second level may include a diffuser; a third level may be disposed within the housing, the third level may include a drip tray with a plurality of openings that form at least a portion of a heat and/or smoke distribution system within the housing; a fourth level may be disposed within the housing, the fourth level may include one or more gutters; a fifth level may be disposed within the housing, the fifth level may include one or more burners of a gas-powered heat source; and a sixth level may be disposed within the housing, the sixth level may include a grilling surface configured for placement of foodstuffs.

The cooking device may include one or more gutters that form a portion of the heat and/or smoke distribution system. The cooking device may include levels that are disposed in a vertically stacked configuration within the housing. The cooking device may include a diffuser that forms a portion of the heat and/or smoke distribution system, the diffuser may be sized and configured to direct heat and/or smoke from the solid fuel heat source towards one or more sides of the housing. The cooking device may include a drip tray that is sized and configured to direct heat and/or smoke from the solid fuel heat source towards one or more sides of the housing. The cooking device may include a drip tray that is removable through an opening in a rear wall of the housing; and the removal of the drip tray may not require the movement, removal, and/or opening of other components. The cooking device may include a drip tray that is connected to a drawer and the drawer may be slidable between a closed position and an open position, and the drawer may be disposed in an opening of the housing. The cooking device may include a plurality of openings in the drip tray including a first plurality of openings and a second plurality of openings. At least some of the openings in the first plurality of openings may have generally the same size, generally the same shape, and spaced apart by a generally constant distance. At least some of the openings in the second plurality of openings may have generally the same size, generally the same shape, and spaced apart by a generally constant distance. The first plurality of openings and the second plurality of openings may be sized and configured to facilitate the flow of heat and/or smoke from the solid fuel source towards the grilling surface.

Another aspect is a combination gas-powered grill and pellet-burning smoker that may include a cooking chamber; a cooking structure may be disposed within the cooking chamber, the cooking structure may include one or more cooking surfaces configured for placement of foodstuffs; a first heat source may be at least partially disposed within the cooking chamber, the first heat source may include one or more gas-powered burners disposed in the cooking chamber; a second heat source may be at least partially disposed within the cooking chamber, the second heat source may include a burn pot sized and configured to burn pelletized fuel, the burn pot may be disposed in the cooking chamber; and a second heat source temperature sensor may be disposed at least proximate the burn pot of the second heat source, the second heat source temperature sensor may be sized and configured to measure a temperature at least proximate the burn pot.

The combination gas-powered grill and pellet-burning smoker may include a second heat source temperature sensor that is used to determine if pellets are burning in the burn pot and if pellets should be supplied to the burn pot. The combination gas-powered grill and pellet-burning smoker may include a first heat source temperature sensor that may be disposed at least proximate the burners of the first heat source, the first heat source temperature sensor may be sized and configured to measure a temperature at least proximate the burners of the first heat source. The combination gas-powered grill and pellet-burning smoker may include a controller in communication with the first heat source temperature sensor and the second heat source temperature sensor, the controller may instruct a feed system to feed more pellets to the burn pot when a temperature at least proximate the burners of the first heat source is less than a selected temperature and a temperature at least proximate the burn pot is less than a selected temperature. The combination gas-powered grill and pellet-burning smoker may include a cooking structure temperature sensor disposed at least proximate the cooking structure, the cooking structure temperature sensor may be sized and configured to measure a temperature at least proximate the cooking structure. The combination gas-powered grill and pellet-burning smoker may include a controller in communication with the cooking structure temperature sensor and the second heat source temperature sensor, the controller may instruct a feed system to feed more pellets to the burn pot when a temperature at least proximate the cooking structure is less than a selected temperature and a temperature at least proximate the burn pot is less than a selected temperature. The combination gas-powered grill and pellet-burning smoker may include a cooking chamber temperature sensor disposed at least proximate the cooking chamber, the cooking chamber temperature sensor may be sized and configured to measure a temperature within the cooking chamber. The combination gas-powered grill and pellet-burning smoker may include a controller in communication with the second heat source temperature sensor and the cooking chamber temperature sensor, the controller may instruct a feed system to feed more pellets to the burn pot when a temperature in the cooking chamber is less than a selected temperature and temperature at least proximate the burn pot is less than a selected temperature.

The combination gas-powered grill and pellet-burning smoker may include the first heat source sized and configured to provide thermal energy directly to the cooking structure; the second heat source sized and configured to provide thermal energy indirectly to the cooking chamber; and the burn pot of the second heat source disposed below the burners of the first heat source in a vertically stacked configuration. The combination gas-powered grill and pellet-burning smoker may include an opening in a wall of the cooking chamber; and a drip tray may be slidably disposed within the opening in the outer wall of the cooking chamber, the drip tray may be movable between a first position and a second position, the first position may include the drip tray disposed between the burners of the first heat source and the burn pot of the second heat source, the second position may include the drip tray at least partially removed from between the burners of the first heat source and the burn pot of the second heat source. The combination gas-powered grill and pellet-burning smoker may include an opening in an outer wall of the cooking chamber; a drip tray may be slidably disposed within the opening in the outer wall of the cooking chamber, the drip tray may be movable between a first position and a second position, the first position may include the drip tray disposed between the burners of the first heat source and the burn pot of the second heat source, the second position may include the drip tray at least partially removed from between the burners of the first heat source and the burn pot of the second heat source; and a heat and/or smoke distribution system may be disposed within the cooking chamber, the heat and/or smoke distribution system may be sized and configured to direct at least a portion of the heat and/or smoke produced by the second heat source towards the cooking structure, the heat and/or smoke distribution system may include one or more gaps disposed about one or more edges of the drip tray and one or more openings in the drip tray.

Still another aspect is a combination gas-powered grill and pellet-burning smoker that may include a cooking chamber; a cooking chamber temperature sensor may be disposed within the cooking chamber; a cooking structure may be disposed within the cooking chamber, the cooking structure may include one or more cooking surfaces configured for placement of foodstuffs; a first heat source may be at least partially disposed within the cooking chamber, the first heat source may include one or more gas-powered burners disposed in the cooking chamber; a first heat source temperature sensor may be disposed at least proximate the first heat source; a second heat source may be at least partially disposed within the cooking chamber, the second heat source may include a burn pot sized and configured to burn pelletized fuel, the burn pot may be disposed in the cooking chamber; a second heat source temperature sensor may be disposed at least proximate the burn pot of the second heat source; and a controller may be in communication with the cooking chamber temperature sensor, the first heat source temperature sensor, and the second heat source temperature sensor, the controller may control a temperature in the cooking chamber based upon a temperature measurement from the first heat source temperature sensor and a temperature measurement from the second heat source temperature sensor.

The combination gas-powered grill and pellet-burning smoker may include the controller instructing the feed system to feed more pellets to the burn pot when a temperature of the cooking chamber is less than a selected temperature and a temperature of the second heat source temperature sensor is less than a selected temperature. The combination gas-powered grill and pellet-burning smoker may include a cooking structure temperature sensor that is sized and configured to measure a temperature at least proximate one or more of the cooking surfaces; and the controller is in communication with the cooking structure temperature sensor. The combination gas-powered grill and pellet-burning smoker may include the controller in communication with the first heat source and the controller may at least partially control the amount of thermal energy generated by the first heat source; and the controller may be in communication with the second heat source and the controller may at least partially control the amount of thermal energy generated by the second heat source.

Yet another aspect is a combination gas-powered grill and pellet-burning smoker that may include a cooking chamber; a cooking chamber temperature sensor may be disposed within the cooking chamber; a cooking structure may be disposed within the cooking chamber, the cooking structure may include one or more cooking surfaces configured for placement of foodstuffs; a first heat source may be at least partially disposed within the cooking chamber, the first heat source may include one or more gas-powered burners disposed in the cooking chamber; a second heat source may be at least partially disposed within the cooking chamber, the second heat source may include a burn pot sized and configured to burn pelletized fuel, the burn pot may be disposed within the cooking chamber; and a second heat source temperature sensor may be disposed at least proximate the burn pot of the second heat source; and a controller may be in communication with the cooking chamber temperature sensor and the second heat source temperature sensor, the controller may instruct a feed system to feed more pellets to the burn pot when a temperature of the cooking chamber is less than a selected temperature and a temperature of the second heat source temperature sensor is less than a selected temperature. The combination gas-powered grill and pellet-burning smoker may include a cooking structure temperature sensor that is sized and configured to measure a temperature at least proximate one or more of the cooking surfaces; the controller may be in communication with the cooking structure temperature sensor; and the controller may instruct a feed system to feed more pellets to the burn pot when a temperature of the cooking chamber is less than a selected temperature, a temperature at least proximate one or more of the cooking surfaces is less than a selected temperature, and a temperature of the second heat source temperature sensor is less than a selected temperature.

The combination gas-powered grill and pellet-burning smoker may include using the second heat source temperature sensor to determine if pellets are burning in the burn pot. The combination gas-powered grill and pellet-burning smoker may include using the second heat source temperature sensor to determine if pellets are burning in the burn pot, if pellets should be supplied to the burn pot, and/or if pellets in the burn pot are generating smoke. The combination gas-powered grill and pellet-burning smoker may include a heating element disposed within the burn pot; and the second heat source temperature sensor may be used to determine if pellets are burning in the burn pot, if pellets should be supplied to the burn pot, and if the heating element should be activated.

These and other aspects, features and advantages will become more fully apparent from the following brief description of the drawings, the drawings, the detailed description of exemplary embodiments, and appended claims.

BRIEF DESCRIPTION OF THE DRAWINGS

The appended drawings contain figures of exemplary embodiments to further illustrate and clarify the above and other aspects, advantages, and features of the present disclosure. It will be appreciated that these drawings depict only exemplary embodiments and are not intended to limit its scope. Additionally, it will be appreciated that while the drawings may illustrate exemplary sizes, scales, relationships, and configurations, the drawings are not intended to limit the scope of the claimed invention. The drawings may be to scale and representative of exemplary embodiments, but are not necessarily to scale. The invention will be described and explained with additional specificity and detail through the use of the accompanying drawings in which:

FIG. 9 is a perspective view of a portion of an exemplary cooking device, illustrating a portion of an exemplary heating system and a portion of an exemplary heat and/or smoke distribution system.

DETAILED DESCRIPTION

Figure 1A:
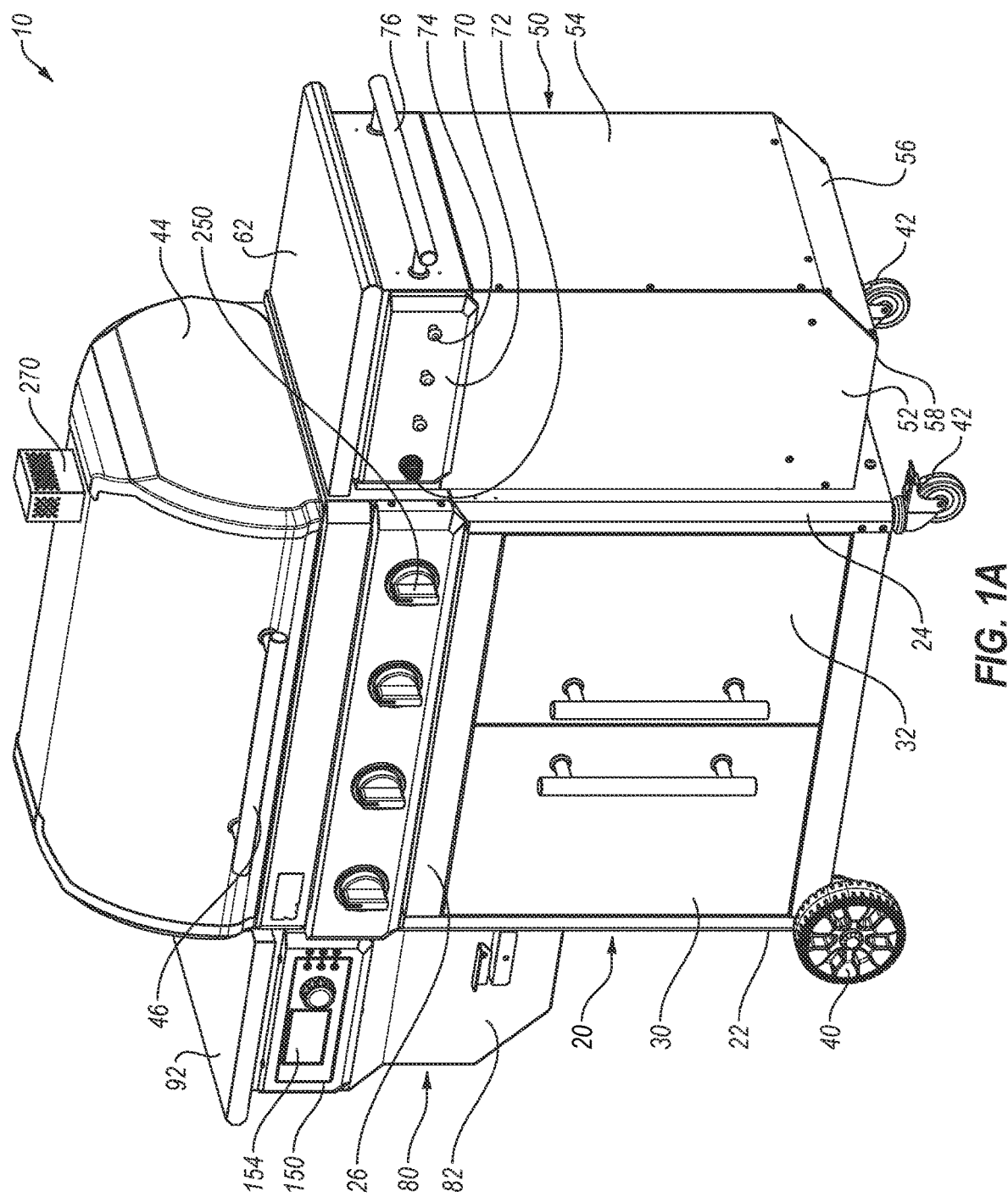
FIG. 1A is a front perspective view of an exemplary cooking device.

This disclosure is generally directed towards cooking devices, and systems, apparatuses, and methods for preparing, warming, and/or cooking foodstuffs, such as a combination grill and/or smoker. Advantageously, the combination grill and/or smoker may prepare, warm, and/or cook foodstuffs by grilling and/or smoking. The principles of the present invention, however, are not limited to a combination grill and/or smoker. It will be understood that, in light of the present disclosure, the combination grill and/or smoker can be successfully used in connection with other types of cooking, heating, cooking devices, and the like.

Additionally, to assist in the description of the combination grill and smoker, words such as top, bottom, front, rear, right, and left may be used to describe the accompanying figures. It will be appreciated, however, that the present invention can be located in a variety of desired positions, including various angles, sideways, and even upside down.

It will also be appreciated that the singular forms "a", "an", and "the" may include plural forms as well, depending, for example, upon context. It will be further appreciated that the terms "comprises", "comprising", "including", and "having" may be inclusive and may specify the presence of stated features, steps, operations, elements, and/or components, but do not preclude the presence or addition of one or more other features, steps, operations, elements, components, and/or groups thereof. In addition, the wording "and/or" can include any and all combinations of one or more of the associated and/or listed items.

Spatially relative terms, such as "inner", "outer", "beneath", "below", "lower", "above", "upper", and the like, may be used for ease of description to describe one or more elements, and/or a relationship to another element(s) or feature(s). Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features depending, for example, upon context. Thus, the example term "below" can encompass both an orientation of above and below. The device may be otherwise oriented (e.g., rotated 90 degrees or at other orientations) and the spatially relative descriptors may be interpreted accordingly. It will be understood that phrases such as "between X and Y" may be interpreted to include X and Y. And phrases such as "from X to Y" may be interpreted to include X and Y.

It will also be understood that wording such as "on", "attached", "connected", etc. may indicate one or more elements are directly on, attached, or connected, and/or one or more intervening elements may also be present. In contrast, when an element is referred to as being, for example, "directly attached to" another element, no intervening elements may be present. It will further be understood that references to a structure or feature that is disposed "adjacent" to another structure or feature may not have portions that touch, overlap, or underlie the adjacent feature.

In addition, it will be understood that wording such as "first", "second", etc. may be used to describe various elements, but these elements should not necessarily be limited by these terms. For example, these terms may be used to distinguish one element from another. Thus, a "first" element could also be termed a "second" element without departing from the teachings of the present disclosure. Additionally, a sequence or process, such as one or more steps, may not be limited to the specific order listed depending upon context. Further, the disclosure may include any number of features, aspects, advantages, and the like, in any combination, and one or more of the features, aspects, advantages, and the like may not be present, needed, or required, The present disclosure could also include one or more additional features, aspects, advantages, and the like depending, for example, upon the intended use of the cooking device 10.

The drawings may be diagrammatic, schematic, and other representations of example embodiments, and may not be intended to limit the present disclosure. Moreover, while various drawings may be provided to scale, and in exemplary arrangements and/or configurations, the drawings are not necessarily drawn to scale and the various embodiments may have other suitable shapes, sizes, arrangements, and/or configurations. Thus, the proportionality, scale, size, shape, form, function, arrangement, configuration, and/or other features of the disclosed embodiments may be altered without necessarily departing from the scope of this disclosure.

In the exemplary embodiments illustrated in the figures, like structures may be provided with similar reference designations for convenience and readability. It will be understood that no limitation of the scope of the disclosure may be intended. It will also be understood that the language used to describe the exemplary embodiments is illustrative only and is not to be construed as limiting the scope of the disclosure.

As seen in the accompanying figures, an exemplary cooking device 10 may include multiple heat sources, such as a first heat source 12 and a second heat source 14. The first heat source 12 and the second heat source 14 may be disposed in a stacked configuration. In particular, the first heat source 12 and the second heat source 14 may be disposed in a vertically stacked configuration.

The first heat source 12 and the second heat source 14 may be different types or kinds of heat sources, and the first and second heat sources may facilitate different kinds of cooking. For example, the first heat source 12 may be better suited for high-heat cooking processes, and the second heat source 14 may be better suited for low-heat cooking processes. The first heat source 12 may provide direct heating of foodstuffs, and the second heat source may provide indirect heating of foodstuffs. The first heat source 12 may use one type of fuel, such as a gas fuel source, and the second heat source 14 may use another type of fuel, such as a solid fuel source. For instance, the first heat source 12 may use propone or natural gas as a fuel source, while the second heat source 14 may use pelletized fuel, such as wood pellets or biomass, as a fuel source. The first heat source 12 may generate or emit a relatively large amount of heat or thermal energy, which may facilitate cooking processes that are relatively short in duration. The second heat source 14 may generate or emit a relatively lower amount of heat or thermal energy, which may allow for cooking processes that are relatively long in duration. The second heat source 14 may also intentionally generate a significant amount of smoke and the smoke may be used to flavor and/or change the taste of the foodstuffs.

The first and/or second heat source 12, 14 may heat a cooking structure 16 and foodstuffs may be placed on the cooking structure. The cooking structure 16 may include one or more cooking surfaces configured for placement of foodstuffs. The cooking structure 16 may have a grill-like configuration and the cooking structure 16 may be in the form of a metal grid, lattice, or framework. The cooking structure 16 may also include one or more elements disposed in a plane, and the cooking structure may be referred to as a cooking grid. The cooking structure 16 may have other configurations, such as a solid surface or a surface with one or more openings. The cooking structure 16 may be removable, which may facilitate cleaning. The cooking structure 16 may be constructed from thermally conductive materials, such as metal or ceramic.

Figure 1B:
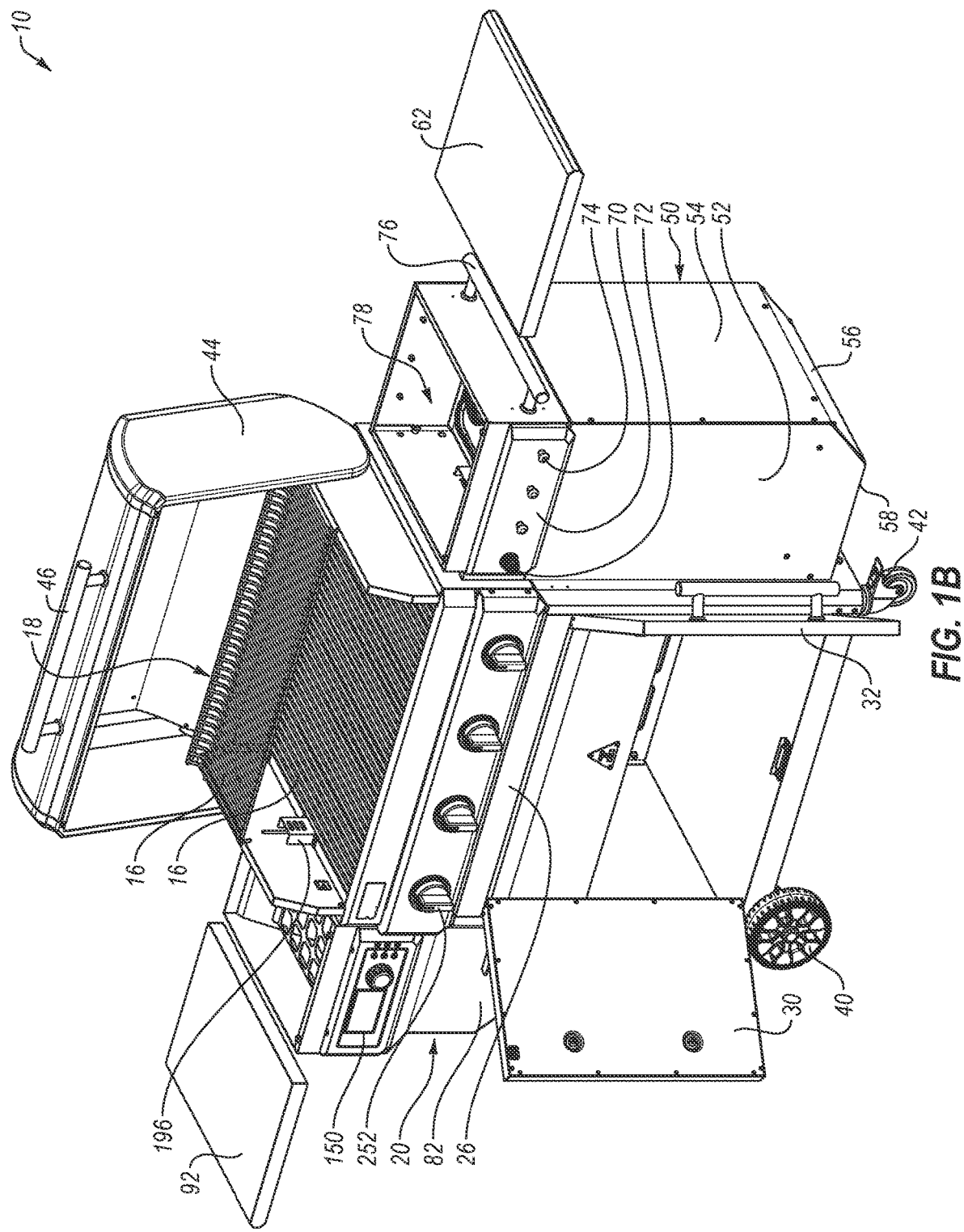
FIG. 1B is another front perspective view of the exemplary cooking device shown in FIG. 1A, illustrating the lid, covers, and doors removed or in an open position.
Figure 3A:
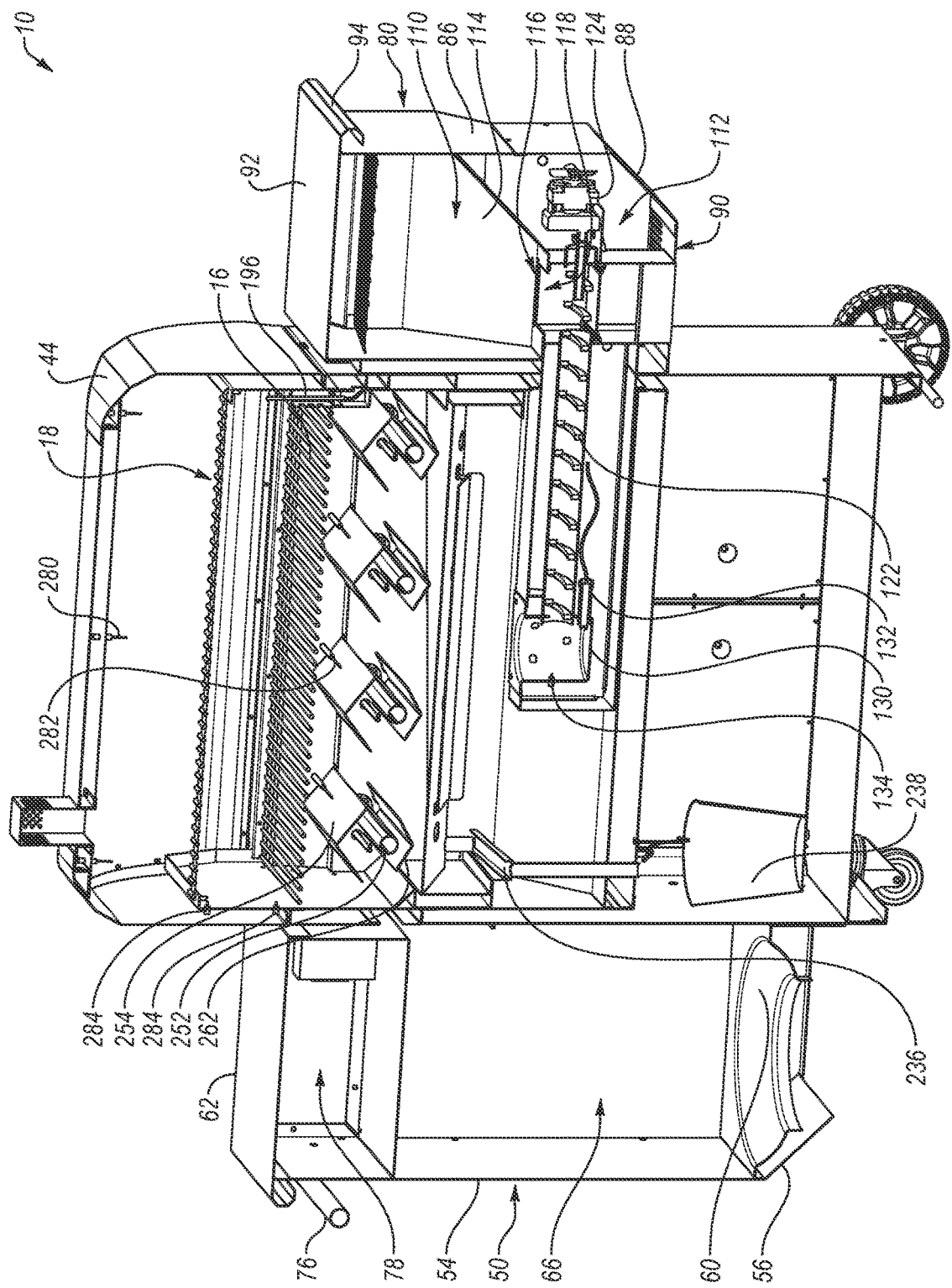
FIG. 3A is a cut-away front view of an exemplary cooking device.

As shown in FIGS. 1B and 3A, the cooking device 10 may include multiple cooking structures 16. This may allow, for example, cooking structures 16 to be placed different distances from the first and second heat sources 12, 14. For instance, a first cooking structure 16 may be placed a first distance away from the first and/or second heat sources 12, 14, and a second cooking structure may be placed a second distance away from the first and/or second heat sources. This may allow, for instance, the first and second cooking structures 16 to be heated differently. The cooking structures 16 may have different sizes, configured to receive different amounts of thermal energy, adjustable, and the like. It will be appreciated that the cooking structure 16 may have other suitable shapes, sizes, configurations, and/or arrangements, and any desired number of cooking structures may be utilized.

Direct heating may include thermal energy generated or emitted from the first heat source 12 that directly heats the foodstuffs. Direct heating may also include thermal energy generated or emitted from the first heat source 12 that heats the cooking structure 16, which then heats the foodstuffs. Direct heating may include cooking processes that are relatively short in duration in comparison to indirect heating. Indirect heating may refer to heating an area or volume, and indirectly heating foodstuffs. Indirect heating may also refer to diffusing or at least partially diffusing thermal energy into the volume which then heats the foodstuffs. Indirect heating may include cooking processes that are longer in duration when compared with direct heating. For instance, direct heating process may have a duration that is measured in minutes and may be less than an hour, while indirect heating process may have a duration that is longer than an hour and may include multiple hours in some embodiments.

The cooking device 10 may enable high-heat operations and/or direct heating by the first heat source 12, and low-heat operations and/or indirect heating by the second heat source 14. The cooking device 10 may allow cooking operations that involve both the first and heat sources 12 and 14. For example, the cooking device 10 may allow independent, autonomous, concurrent, and/or simultaneous cooking operators with the first and/or second heat sources 12 and 14. This may allow, for instance, cooking operations that involve the first and/or the second heat sources 12, 14.

The cooking structure 16 may be disposed in a cooking volume or chamber 18. The cooking chamber 18 may be intended to receive foodstuffs and foodstuffs may be prepared, warmed, and/or cooked within the cooking chamber.

The cooking chamber 18 may include at least a portion of the first heat source 12 and at least a portion of the second heat source 14. The cooking chamber 18 may be a single, integrated volume that receives thermal energy from both the first heat source 12 and the second heat source 14.

The first heat source 12 may be a gas-powered grill that may be used for cooking processes such as grilling, barbequing, chargrilling, and other types of warming, preparing, and/or cooking foodstuffs. It will be appreciated that wording such as "grill", "grilling", and "gas-powered grill" may refer to the first heat source 12.

The second heat source 14 may be referred to as a smoker because it may be used for smoking and/or indirect heating of foodstuffs. The second heat source 14, however, does not require the use of smoke and could be used for other suitable cooking processes or operations. Thus, the cooking device 10 may be referred to as a combination grill and/or smoker for convenience and readability, but it will be understood that the cooking device (including the first heat source 12 and/or the second heat source 14) may be used for various cooking operations and processes.

The cooking device 10 may include an enclosure 20, which may form at least a portion of a base or body of the cooking device. The enclosure 20 may enclosure and/or support at least a portion of the cooking chamber 18. The enclosure 20 may have a generally rectangular configuration with a first side 22 and a second side 24. A front portion 26 of the enclosure 20 may include one or more doors, such as a first door 30 and a second door 32, and the doors may include handles. The first door 30 and/or the second door 32 may provide access to an interior portion of the enclosure 20. A rear portion 28 of the enclosure 20 may include one or more openings or vents 34. The vents 34 may provide ventilation, cooling, airflow, etc. to one or more portions of the cooking chamber 18 and/or the enclosure 20.

A movable portion, such as a drawer 36, may be disposed in a portion of the enclosure 20, such as the rear portion 28. The drawer 36, which may be partially and/or completely removable from the enclosure 20, may provide access to an interior portion of the cooking chamber 18 and/or enclosure 20.

In some embodiments, the cooking device 10 may be configured to be moveable. For example, the cooking device 10 may include one or more wheels or other moving elements. In greater detail, the cooking device 10 may include a first set of wheels 40 and a second set of wheels 42. The first and second sets of wheels 40, 42 may be disposed on different sides of the enclosure 20, and the first set of wheels may be larger than the second set of wheels. The first set of wheels 40 may be attached to an axle and may rotate in a first direction. The second set of wheels 42 may include two independent wheels and the wheels may be movable in different directions. For example, the second set of wheels 42 may be castor type wheels, such as swivel castors, while may facilitate movement of the cooking device 10 in multiple directions. One or more of the wheels 40, 42 may include a lock and/or brake, which may prevent the wheel from inadvertently moving or turning. In other embodiments, the cooking device 10 may be configured as a stationary appliance and/or may be installed in a relatively permanent fashion (e.g., bolted or otherwise fastened to a wall and/or floor, or otherwise installed as part of a kitchen or cooking area). Accordingly, it will be appreciated, after reviewing this disclosure, that the cooking device 10 may have other suitable shapes, sizes, configurations, and/or arrangements depending, for example, if the cooking device is intended to be movable, stationary, built into a structure, etc.

As seen in FIGS. 1A-1E, the cooking device 10 may include a lid 44 and the lid may be opened and/or closed. The lid 44 may be pivotally attached to the enclosure 20 and the lid may form a portion of the cooking chamber 18. For example, when the lid 44 is closed, the lid may form an upper portion of the cooking chamber 18. It will be appreciated that the lid 44 may be disposed in the open position in some cooking operations. The lid 44 may provide access to the cooking chamber 18 and may facilitate placement and/or removal of foodstuffs from the cooking structure 16. The lid 44 may also provide access to the first heat source 12, the second heat source 14, and other internal portions of the cooking device 10. A handle 46 may be attached to the lid 44.

The cooking device 10 may supply fuel to the first heat source 12. For example, if the first heat source 12 is a gas-powered grill, the cooking device 10 may include a housing 50 that is sized and configured to contain fuel for the first heat source 12. Thus, the housing 50 may be sized and configured to receive a gas canister (not shown) such as a propane tank or a natural gas cylinder. The housing 50 may include a front surface 52, a sidewall 54, an angled surface 56, and a bottom portion 58. The bottom portion 58 may include a recess 60 that is sized and configured to receive a lower portion of the gas canister. The housing 50 may include a lid or cover 62, and the cover may be movable and/or removable to provide access to an interior portion of the housing. The cover 62 may have a flat upper surface, if desired. The housing 50 may include a rear surface 64 with an opening or open area 66. The open area 66 may provide access, ventilation, and/or airflow to an inner portion of the housing 50 and/or the gas canister.

As shown in the accompanying figures, the housing 50 may be attached to the enclosure 20. The housing 50 and the enclosure 20 may also share one or more structures, such as a common wall. The housing 50 may be permanently or selectively attached to the enclosure 20 depending, for example, upon the intended use of the cooking device 10. The housing 50 may also be spaced apart from the enclosure 20, and insulation or other materials may be disposed between the housing and the enclosure. Thus, the housing 50 may be a separate structure that is attached to the enclosure 20, or the housing and the enclosure could be part of a unitary, one-piece structure.

The housing 50 may include one or more components or accessories, such as a front panel 70. The front panel 70 may include one or more knobs, switches, projections, and the like. For example, the front panel 70 may include a control 72 and the control may be used to turn on and/or off one or more features or functions, such as the fuel supply to the first heat source 12. The front panel 70 may also include one or more supports 74, such as hooks, hangers, etc. The supports 74 may be sized and configured to support cooking and/or barbequing tools such as spatulas, forks, tongs, basting brushes, and the like. A handle 76 may be attached to the housing 50 and the handle may have one or more purposes. For example, the handle 76 may be grasped by a user, aid in moving the cooking device 10, supporting items such as towels and/or utensils, etc. The housing 50 may include an interior portion 78 and the interior portion may be disposed at an upper portion of the housing. The interior portion 78 may be used for storage or other suitable purposes. For example, a portion of a gas flow or gas control system for the first heat source 12 may be at least partially disposed in the interior portion 78.

The cooking device 10 may supply fuel to the second heat source 14. For example, if the second heat source 14 uses solid fuel, such as pelletized fuel, the cooking device 10 may include a housing 80 that is sized and configured to contain fuel for the second heat source. The housing 80 may include a front surface 82, a rear surface 84, a sidewall 86, an angled surface 88, and a bottom surface 90. The housing 80 may include a lid or cover 92, and the cover may be movable to provide access to an interior portion of the housing. The cover 92 may include a lip 94 and one or more hinges 96 may allow the cover to move between open and closed positions. The rear surface 84 of the housing 80 may include one or more openings or vents 98. The rear surface 84 of the housing 80 may also include a bracket 100 and the bracket may be sized and configured to allow a power cord (not shown) to be wrapped around the bracket. The power cord may supply electrical power of the cooking device 10.

The housing 80 may be attached to the enclosure 20 and, as shown in the accompanying figures, the housing 80 may be disposed on an opposite side of the enclosure from the housing 50. The housing 80 may be a separate structure that is attached to the enclosure 20 by one or more fasteners, and the housing 80 may be permanently or selectively attached to the enclosure 20. The housing 80 and the enclosure 20 may also be part of a unitary, one-piece structure. If desired, the housing 80 and the enclosure 20 may share one or more structures, such as a common wall. The housing 80 may also be spaced apart from the enclosure 20 by a distance which may allow, for example, insulation or other materials to be disposed between the housing and the enclosure.

The housing 80 may store and/or contain fuel for the second heat source 14. For example, if the second heat source 14 includes a pellet burner, a pellet reservoir or hopper 110 may be at least partially deposed within the housing 80 and the hopper may store and/or contain pellets. A feed system 112 may feed pellets from the hopper 110 to the pellet burner. The pellets may be compressed biofuel, biomass, or other suitable materials that may be used as a fuel source. The pellets may be configured to emit heat and/or smoke during combustion.

An exemplary embodiment of the hopper 110 is shown in FIGS. 3A, and 5A-5C. The hopper 110 may be a single, large hopper that is sized and configured to hold fuel, such as the pelletized fuel. It will be appreciated that the hopper 110 may include one or more compartments and/or one or more hoppers may be utilized. In these exemplary embodiments, multiple different types of pelletized fuels may be simultaneously used and/or stored. This may allow different types of pelletized fuel to be used without requiring one type of pelletized fuel to be removed from the hopper 110 and replaced with a different type of pelletized fuel. It will also be appreciated that multiple hoppers 110 and/or a hopper subdivided into multiple compartments may be configured to deliver different combinations and/or mixtures of pelletized fuels to the feed system 112, which may allow customized flavor profiles to be created.

Figure 5A:
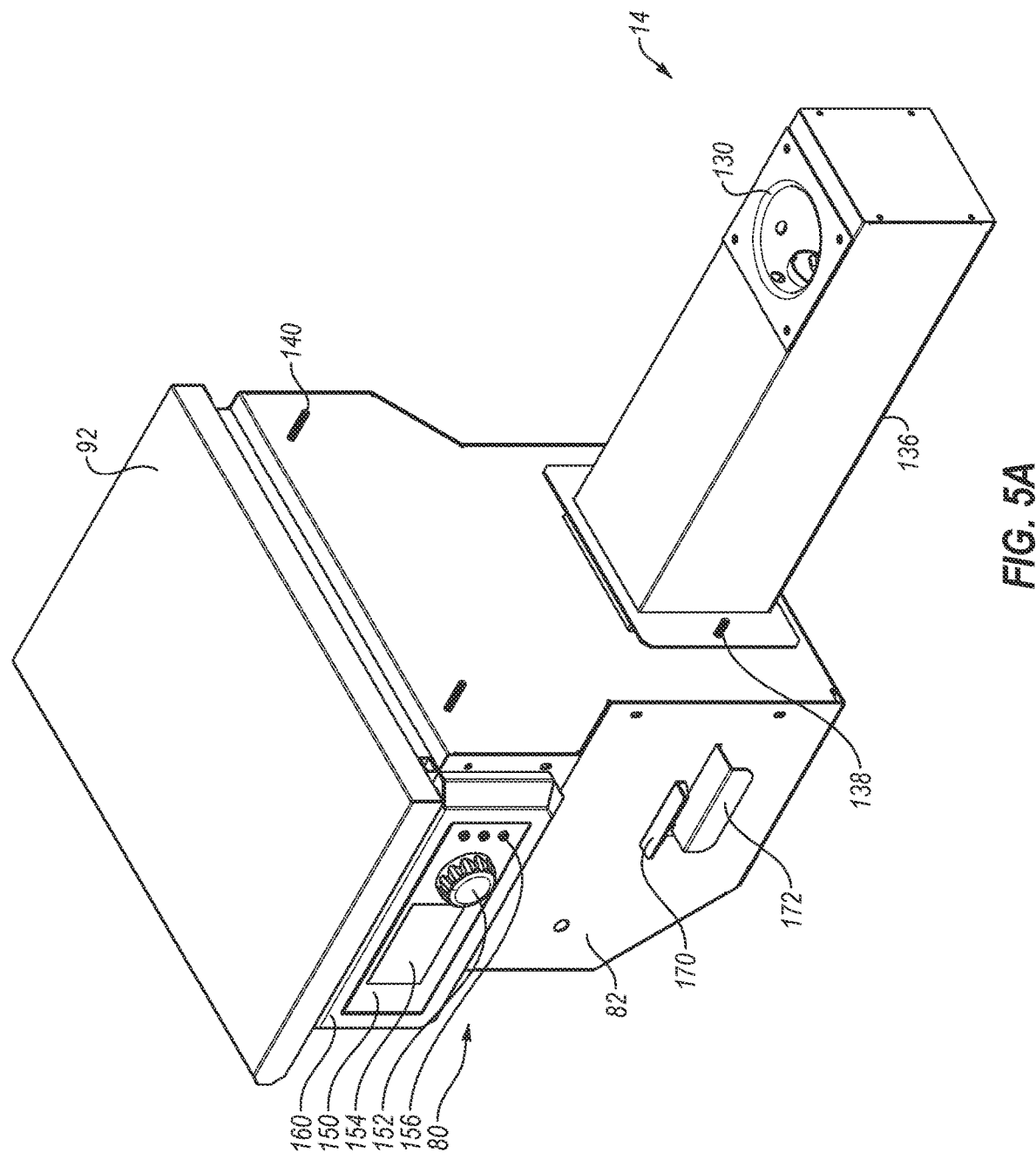
FIG. 5A is an upper perspective view of an exemplary fuel delivery system for a cooking device, illustrating a fuel delivery system that provides pelletized fuel to a burn pot.
Figure 5B:
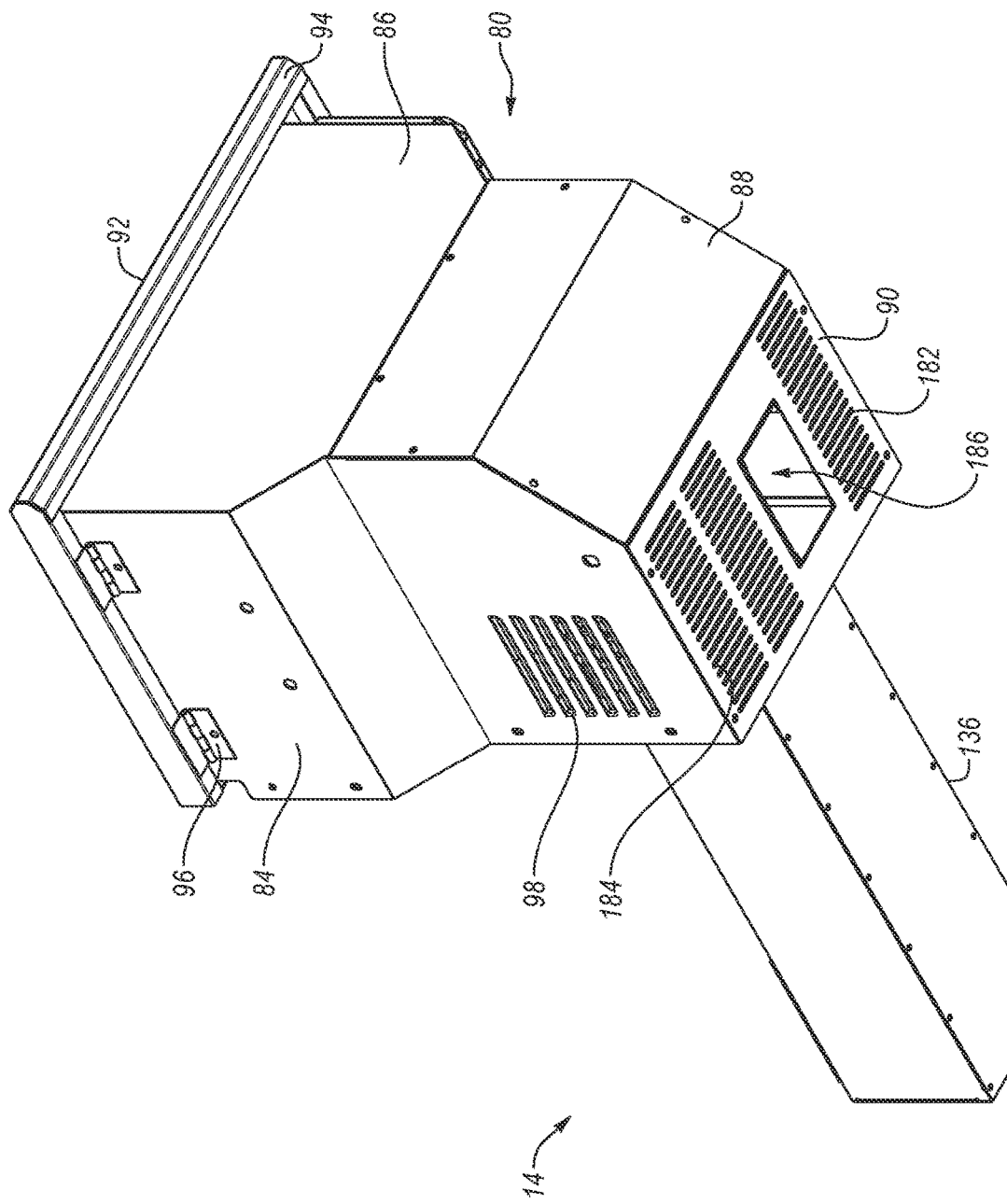
FIG. 5B is a lower perspective view of the exemplary fuel delivery system shown in FIG. 5A.
Figure 5C:
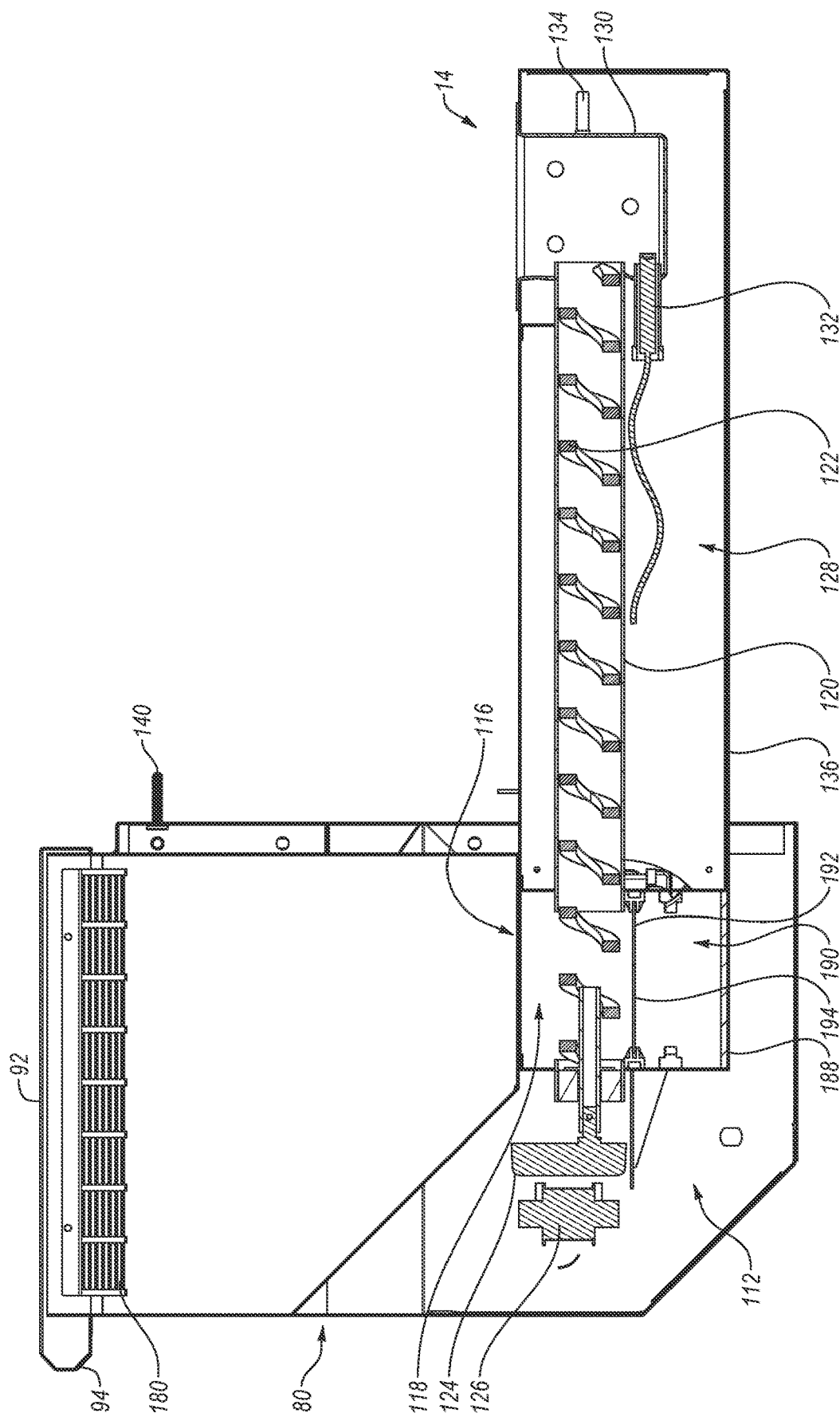
FIG. 5C is a partial cut-away side view of the exemplary fuel delivery system shown in FIG. 5A.

As seen in FIGS. 5A-5C, the hopper 110 may be connected to a feed system 112. For example, the hopper 110 may include a sloped surface 114 that directs pellets towards an opening 116 in a lower portion of the hopper. The pellets may travel through the opening 116 and into a pathway 118. The pathway 118 may direct the pellets into an auger conduit 120. An auger 122 may be disposed in the auger conduit 120 and the auger may be driven by a motor 124. The auger 122 may be used to transport pellets from the hopper 110, through the auger conduit 120, and into an area where combustion of the pellets may occur. A blower or fan 126, which may be disposed near the auger conduit 120, the auger 122, and/or the motor 124, may provide or direct air towards the combustion area. For example, the fan 126 may blow air down a pathway 128 towards the combustion area.

The feed system 112 may feed the pellets to a burn pot 130, which may also be referred to as a burn chamber or firebox, where combustion may occur. The pellets may be ignited by a heating element 132. Once ignited, thermal energy generated by the combustion of pelletized fuel in the burn pot 130 may be sufficient to ignite and combust subsequent fuel as it is delivered to the burn pot by the auger 122. The heating element 132 may be used whenever necessary and/or desired to ignite the fuel. The heating element 132 may also be used for other purposes such as causing the fuel to smolder or smoke.

One or more sensors 134, such as heat probes, thermocouples, temperature sensors, and the like, may be disposed at least proximate the burn pot 130. The one or more sensors 134 may help determine if the pellets are burning, smoldering, etc. The one or more sensors 134 may also help determine if additional pellets need to be supplied to the burn pot 130 and/or if the supply of pellets to the burn port 130 should stop, be supplied at a different rate, etc.

As seen in FIGS. 5A-5C, at least a portion of the feed system 112 may be disposed within a housing 136. For example, at least a portion of the auger conduit 120, the auger 122, the pathway 128, and/or the burn pot 130 may be at least partially disposed within the housing 136. The housing 136 and the housing 80 may be connected by one or more fasteners 138, such as screws or bolts. In addition, as shown in FIG. 5A, the housing 80 may be attached to the enclosure 20 by one or more fasteners 140, such as screws or bolts.

The cooking device 10 may include other components, features, aspects, and the like. For example, the cooking device 10 may include one or more electronic components, electronic controls, displays, information systems, etc., which may facilitate control over one or more portions or systems of the cooking device. For instance, the cooking device 10 may include a control panel 150 and the control panel may control one or more components, features, aspects, and the like of the cooking system. The control panel 150 may be disposed on any suitable portion of the cooking device 10, such as an upper portion of the housing 80. The control panel 150 may include one or more inputs 152, one or more displays 154, and one or more controls 156, such as buttons, knobs, switches, etc. A controller 160, which may be disposed behind and/or within the control panel 150, may be connected to the one or more inputs 152, the one or more displays 154, and/or the one or more controls 156. The controller 160 may also be connected to other components, systems, and features, such as the feed system 112, sensors (e.g., the sensor 134), and the like. The controller 160 may form at least a portion of a computing device that controls one or more aspects, features, components, and the like of the cooking device 10.

In an exemplary embodiment, the controller 160 may enable input of control settings such as a temperature (e.g., 225 Fahrenheit (F)), an operating level (e.g., high, low, medium), and/or a function (e.g., heat, smoke, warm). The controller 160 may control components such as the feed system 112, the auger 122, the motor 124, the fan 126, the heating element 132, etc. For example, the controller 160 may control a temperature of the first heat source 12, a temperature of the second heat source 14, a temperature of the cooking structure 16, a temperature of the cooking chamber 18, operation of the auger 122, operation of the fan 126, rotational speed of the auger 122, rotational speed of the fan 126, a temperature of the burn pot 130, a temperature of the heating element 132, etc., or some combination thereof. In some embodiments, the controller 160 may receive inputs from the user, one or more sensors, and/or other suitable devices. Advantageously, the controller 160 may automatically, or at least partially automatically, control the feed system 112, the auger 122, the motor 124, the fan 126, the heating element 132, etc., which may allow a desired temperature to be obtained and/or maintained. The controller 160 may also be used to control the amount of smoke generated by the second heat source 14. For example, the controller 160 may be used to generate more or less smoke depending, for example, upon the intended use of the cooking device 10.

By controlling the speed and/or number of pellets delivered to the burn pot 130, the controller 160 may control the temperature within the cooking chamber 18. For example, the user may select a temperature and the controller 160 may control the feed system 112 based upon a temperature reading from one or more sensors. For instance, the controller 160 may instruct the motor 124 to turn on and/or off, or may change the speed of the motor, which may increase and/or decrease the number of pellets supplied to the burn pot 130, which may increase, decrease, and/or maintain the temperature within the cooking chamber 18. In an exemplary embodiment, the controller 160 may use a proportional-integral-derivative ("PID") control algorithm. The controller 160 may also control other devices. For example, the controller 160 may turn the fan 126 on and/or off, or may change the speed of the fan. In addition, the controller 160 may turn the heating element 132 on and/or off, or may change the temperature of the heating element. Advantageously, by controlling the auger 122, the motor 124, the fan 126, the heating element 132, etc., the controller 160 may control the heat within the cooking chamber 18, the generation of smoke, etc.

In greater detail, the controller 160 may at least partially automatically control the generation of smoke. For example, in accordance with one or more exemplary embodiments, the controller 160 may generate smoke according to one or more profiles or processes. The exemplary processes could include temporary creation of additional smoke, generation of additional smoke for an extended period of time, maximum generation of smoke, and the like. For example, a process that may generate a large amount of smoke may include the auger 122 delivering pellets to the burn pot 130 for a period of time, such as about 10 to about 20 seconds. During the delivery of the pellets to the burn pot 130, the fan 126 may be on (the fan may typically be on when using the second heat source 14). Adding pellets to the burn pot 130 may initially cause combustion and/or generation of thermal energy to decrease. For example, the additional pellets may smother a portion of the combustion within the burn pot 130 and/or a portion of the energy may be used to ignite the additional pellets. During or shortly after the pellets are delivered to the burn pot 130, the fan 126 may be turned off for a period of time such as about 1 second to about 20 seconds, about 1 second to about 10 seconds, about 1 second to about 5 seconds, or less than about 5 seconds. The fan 126 may be turned off for a period of time such as about 20 seconds, about 15 seconds, about 10 seconds, about 5 seconds, or less, and then then fan may be turned back on. Advantageously, this process may generate a significant, if not a relatively maximum, amount of smoke. In addition, this process may be effective at different temperatures. That is, this process may be effective at various temperatures such as about 160 degrees F., about 180 degrees F., about 120 degrees F., and the like. Further, this process may generate smoke without causing significant temperature changes in the cooking chamber 18. That is, this process may generate a significant amount of smoke without creating large temperature fluctuations. Because significant amounts of smoke can be generated without causing a large increase or decrease in generation of thermal energy, more consistent temperatures may be maintained within the cooking chamber 18 and/or smoke can be generated using a smaller amount of fuel.

The controller 160 may also facilitate delivery of pellets to the burn pot 130. Advantageously, the controller 160 may control delivery of pellets based upon temperature from multiple different sources. For example, the controller 160 may use one or more temperature readings, such as at the cooking structure 16, the cooking chamber 18 and/or the burn pot 130, to determine when pellets should be delivered to the burn pot. This may allow temperature variations within the cooking chamber 18 to be minimized or maintained within a relatively small range. Advantageously, the temperature variation may be significantly smaller than the temperature variation within traditional wood pellet-burning systems. In an exemplary embodiment, a desired temperature in the cooking chamber 18 may be 180 degrees F. and the controller 160 may know the temperature from one or more sensors, such as sensors located proximate the cooking structure 16 and/or within the cooking chamber 18. The controller 160 may also know the temperature at the burn pot 130, which may indicate the amount of thermal energy currently being generated at the burn pot. The controller 160 may use the feed system 112 to feed more pellets to the burn pot 130 when a temperature varies by a certain amount, such as plus and/or minus about 5 degrees F., plus and/or minus about 10 degrees F., plus and/or minus about 15 degrees F., plus and/or minus about 20 degrees F., or more. By controlling the delivery of pellets to the burn pot 130 based upon temperature measurements at multiple locations, excessive heat (such as about 40 degrees F. or more) caused by the delivery of too many pellets to the burn pot may be avoided. In addition, because the delivery of pellets to the burn pot 130 may be based upon multiple temperature readings, and delivery of pellets to the burn pot may be based upon need rather than for a predetermined about of time, a more constant temperature may be maintained within the cooking chamber 18. Further, because excessive amounts of pellets may not be delivered to the burn pot, a more constant temperature may be maintained, and fuel may be conserved.

The controller 160 may provide a more constant temperature within the cooking chamber 18 by, for example, more precisely determining when pellets should be delivered to the burn pot 130 and how many pellets should be delivered to the burn pot. Thus, instead of delivering pellets for a predetermined amount of time, the controller 160 may vary the amount of time in which pellets are delivered to the burn pot 130. This may allow the cooking device 10 to maintain a temperature within the cooking chamber 18 within a ranges, such as plus and/or minus about 5 degrees F., plus and/or minus about 10 degrees F., plus and/or minus about 15 degrees F., plus and/or minus about 20 degrees F., plus and/or minus about 25 degrees F., or plus and/or minus about 30 degrees F. In contrast, known wood pellet-burning systems often have temperature variations within the cooking chamber 18 of plus and/or minus 50 degrees F. or more. Advantageously, the significantly more constant temperature within the cooking chamber 18 may allow, for example, faster cooking times, more predictable cooking, less use of fuel, and the like.

The housing 80 may include one or more flanges 170 and/or or brackets 172. The flanges 170 and the brackets 172, which may be disposed on the front surface 82 of the housing 80, may be sized and configured to hold and/or support one or more items. The housing 80 may also include one or more openings or vents. For example, the housing 80 may include one or more vents, such as the vents 98 and vents 180 disposed in the front surface 82. The housing 80 may also include vents 182 and vents 184 disposed in the bottom surface 90. The vents 98, 180, 182, and/or 184 may be sized and configured to provide ventilation, cooling, airflow, etc. to one or more portions of the housing 80. After reviewing this disclosure, one skilled in the art will appreciate that any number of vents may be used and the vents may have various suitable shapes, sizes, configurations and/or arrangements.

The bottom surface 90 of the housing 80 may include an opening 186 and the opening may be at least partially aligned with a portion of the feed system 112. For example, the opening 186 may be at least partially aligned with an opening 188 disposed in the housing 136. The opening 186 and/or the opening 188 may form at least a portion of a passageway 190 and the passageway may lead to an access 192 disposed at least proximate a portion of the auger 122. A door or closure 194, such as a trapdoor or hatch, may be disposed at least proximate the access portion 192 and the door may be movable between an open position and a closed position. The door 194 may be biased into a desired position, such as a closed position. For example, the door 194 may be spring-loaded or otherwise configured such that a force is required to open the door. The opening 186, the opening 188, the passageway 190, the access portion 192, and/or the door 194 may facilitate cleaning, maintenance, and repair. For example, as discussed above, pellets from the hopper 110 may be fed to the feed system 112 through an opening 116 in the bottom of the hopper and the auger 122 may supply pellets to the burn pot 130. When the cooking device 10 is being cleaned, for example, it may be desired to remove some or all of the pellets. Advantageously, the door 194 may be opened to allow pellets to travel through the access portion 192, the passageway 190, the opening 188, and/or the opening 186. If the door 194 is disposed at least proximate a lowest point of the auger conduit 120 and/or the auger 122, that may further facilitate removal of the pellets. Additionally, the motor 124 may be reversed to facilitate removal of pellets. This may facilitate faster and more efficient removal of the pellets from the cooking device 10 and/or the feed system 112. This may also allow different types of pellets to be more readily used, which may increase the functionality of the cooking device 10.

Figure 3B:
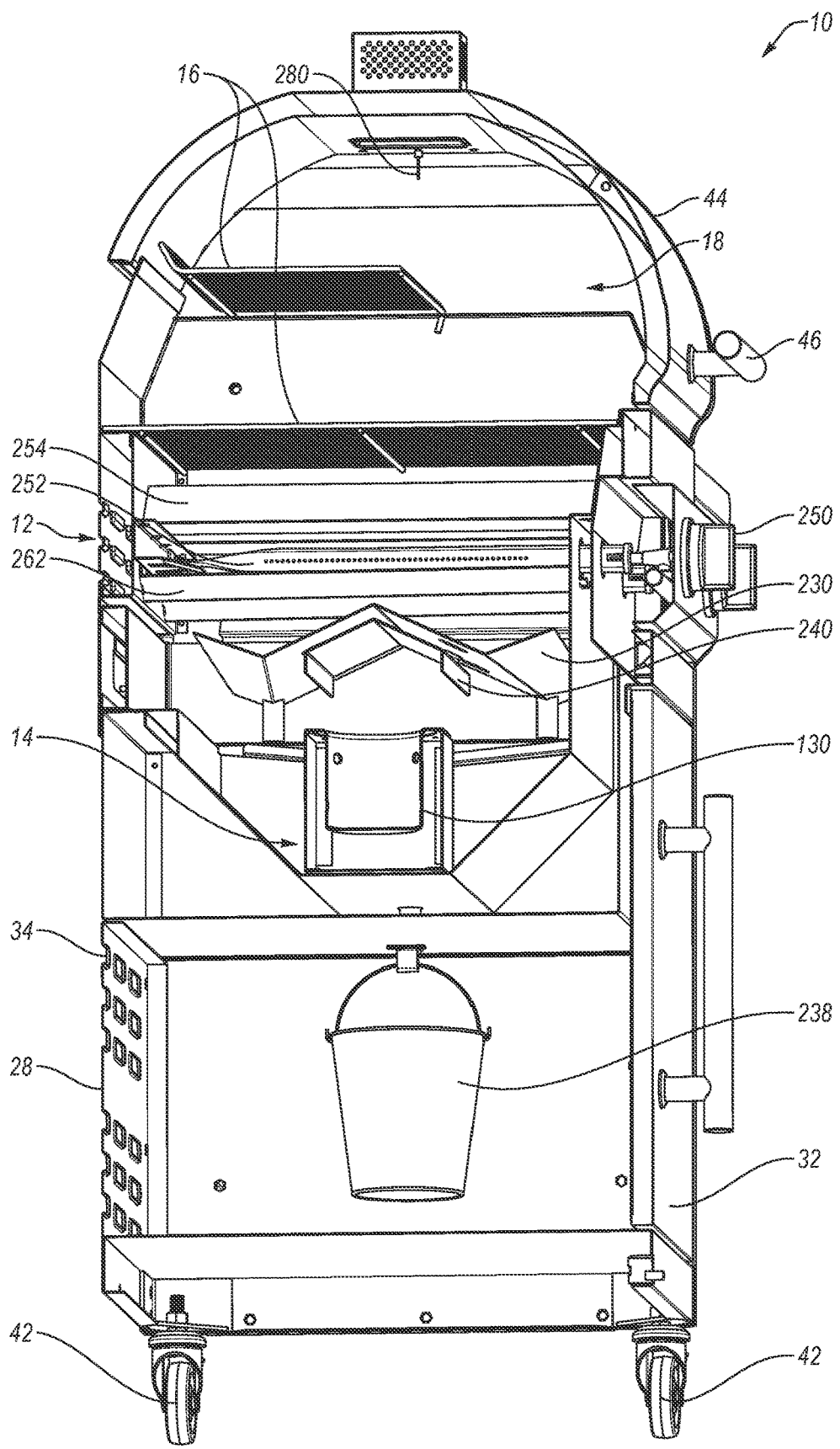
FIG. 3B is a cut-away side view of the exemplary cooking device shown in FIG. 3A.
Figure 4A:
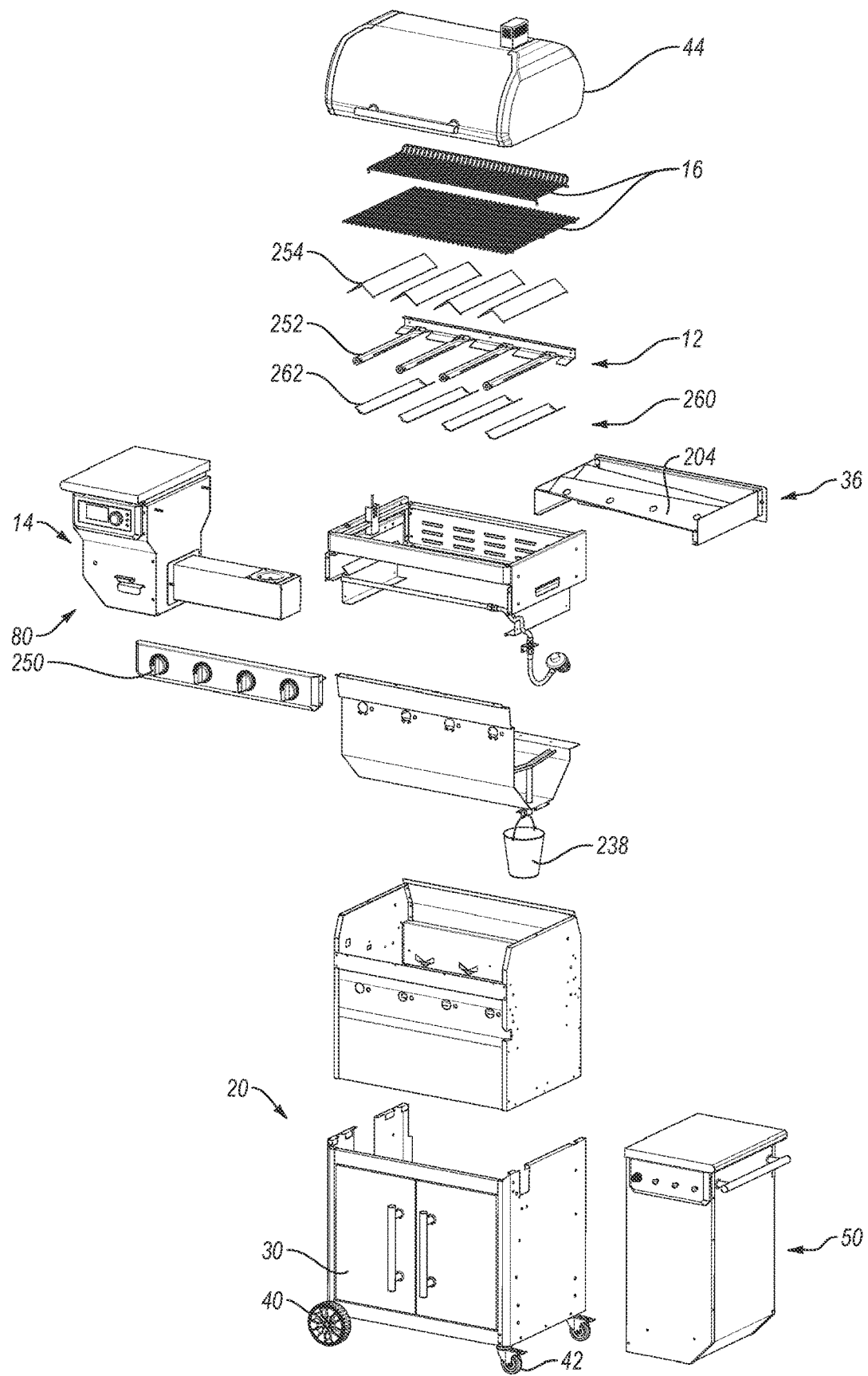
FIG. 4A is an exploded front perspective view of an exemplary cooking device.
Figure 4B:
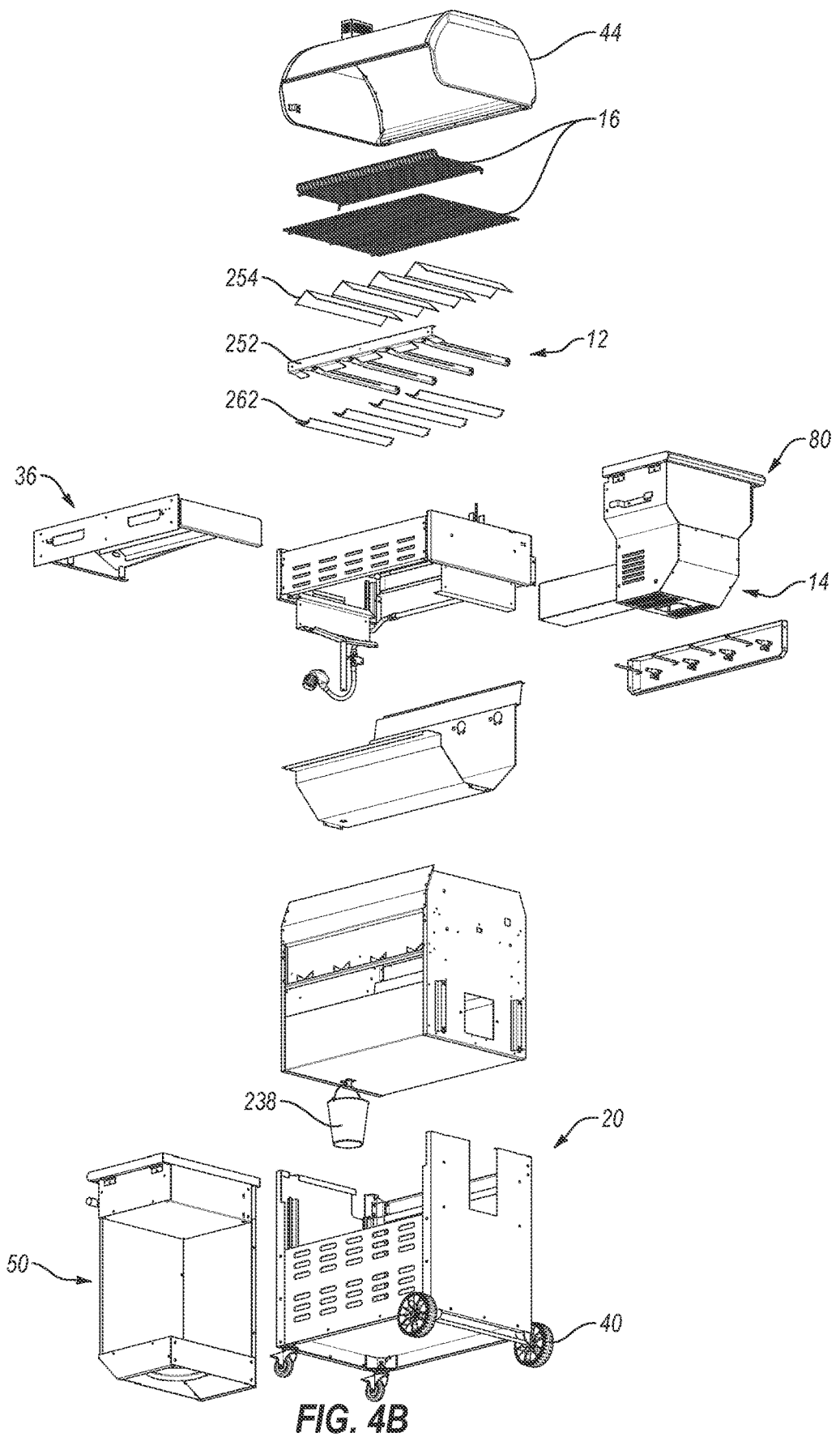
FIG. 4B is an exploded rear perspective view of the exemplary cooking device shown in FIG. 4A.

As seen in FIGS. 3A and 3B, the burn pot 130 may be generally centralized disposed within the enclosure 20. The burn pot 130, along with the feed system 112, may form part of the second heat source 14 and, as discussed above, the second heat source may indirectly provide thermal energy and/or smoke to an interior of the cooking chamber 18. The second heat source 14 may be referred to as "smoking" or a "smoker" because it may indirectly deliver heat and/or smoke to the cooking chamber 18. The smoker may be used in different ways and with different cooking techniques depending, for example, upon the intended use of the cooking device 10. It will also be appreciated that the smoker may supply different amounts of heat and/or smoke to the cooking chamber 18. While the smoker may be used for low-heat preparing, warming, and/or cooking foodstuffs, the smoker may also be used to high-heat preparing, warming, and/or cooking foodstuffs. Thus, if desired, the smoker may also be used for higher temperature preparing, warming, and/or cooking foodstuffs.

In operation, the feed system 112 may feed pellets from the hopper 110 to the burn pot 130 via the auger 122, which may be driven by the motor 124. One or more temperature sensors, such as a temperature sensor 196 located at or proximate the cooking structure 16, may provide information to a controller, such as the controller 160, that controls the feed system 112. The controller 160, for example, may deliver pellets to the burn pot 130 based upon temperature measured by the first sensor 134 and the second sensor 196. As discussed below, the controller 160 may also receive information from other sensors such as sensors disposed at least proximate the lid, burners, cooking structure 16, and the like.

As discussed above, the first heat source 12 may be a high-heat source that includes one or more gas burners that may be used for warming, cooking, and/or preparing foodstuffs at a relatively high temperature (e.g., greater than about 350 degrees Fahrenheit (F)) and/or direct cooking processes. The second heat source 14 may be a relatively low-heat source that includes a wood pellet burner that may be used for warming, cooking, and/or preparing foodstuffs at a relatively low temperature (e.g., lower than about 350 degrees F.) and/or indirect cooking processes.

The first heat source 12 may be operated while the second heat source 14 is not operational and vice versa. In addition, the first heat source 12 and the second heat source 14 may be usable concurrently and/or in some combination. Use of the first and second heat sources 12 and 14 together may reduce fuel use and reduce time involved in the cooking process when compared to a similar process performed by conventional cooking devices.

For instance, an example process may involve heating the cooking chamber 18 to about 225 degrees F. or other suitable temperature. After the volume is heated to about 225 degrees F., foodstuffs may be placed on the cooking structure 16 (it will be appreciated that foodstuffs may also be placed in the cooking chamber during the heating process). The cooking chamber 18 may be maintained at about 225 degrees F. for several hours as part the smoking process. The foodstuffs may then be seared at high temperature to complete the cooking process. Advantageously, the cooking device 10 may use the first and second heat sources 12, 14 during the cooking process without moving the foodstuffs within the cooking chamber 18 or moving the foodstuffs to a different cooking chamber. For instance, in this exemplary embodiment, the first heat source 12 may be used to heat the cooking chamber 18 to the 225 degrees F. The first heat source 12 may be used because it may be capable of heating the cooking chamber 18 to a particular temperature at a higher rate than the second heat source 14. After the cooking chamber 18 is heated, the second heat source 14 may be used to maintain the desired temperature. The second heat source 14 may indirectly provide thermal energy and smoke to the cooking chamber 18. The first heat source 12 may not be used during this time. The foodstuffs may be seared at the end of this exemplary cooking process by turning on or increasing the heat provided by the first heat source 12. The first heat source 12 may be used because it may allow the temperature of the cooking chamber 18 to be rapidly increased. The second heat source 14 may be turned off during the searing process, if desired. Because the first heat source 12 and the second heat source 14 may be used independently and/or in combination, the amount of fuel used by the first heat source 12 and/or the second heat source 14 may be reduced. In addition, the cooking device 10 may reduce cooking times and may allow more rapid temperature changes.

Figure 1C:
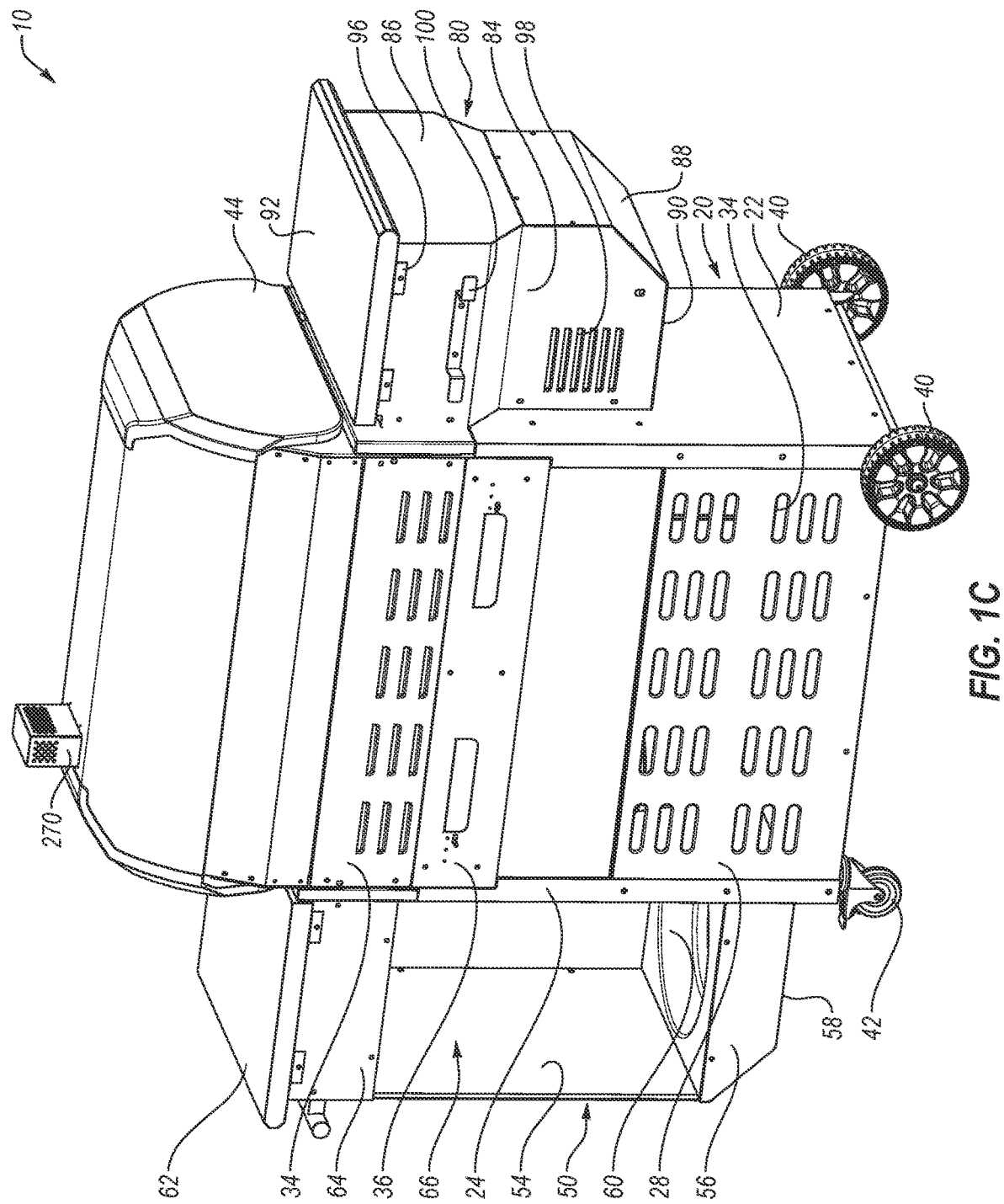
FIG. 1C is a rear perspective view of the exemplary cooking device shown in FIG. 1A.
Figure 1D:
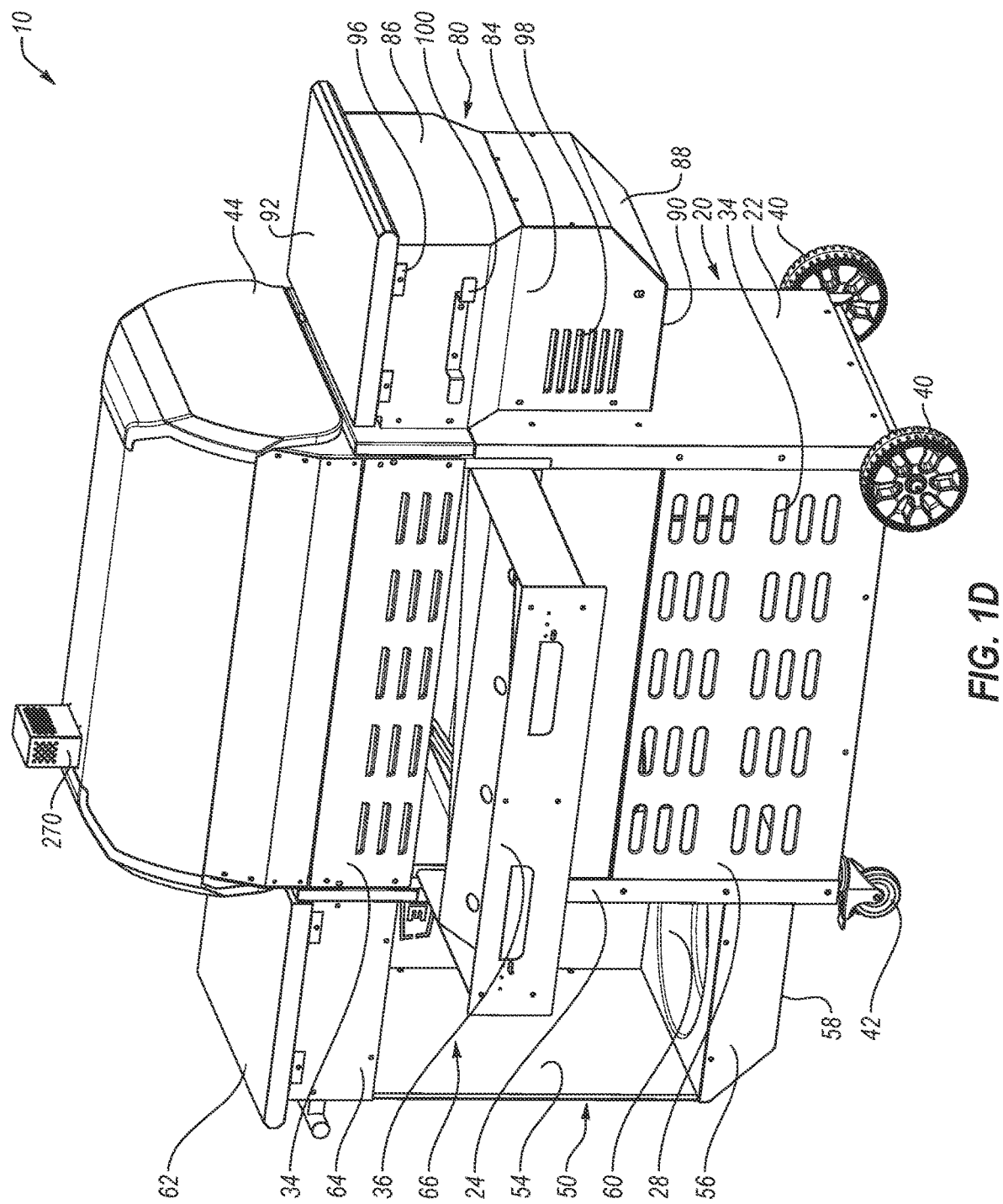
FIG. 1D is another rear perspective view of the exemplary cooking device shown in FIG. 1A, illustrating a drawer, baffle, and/or drip tray in an open position.
Figure 1E:
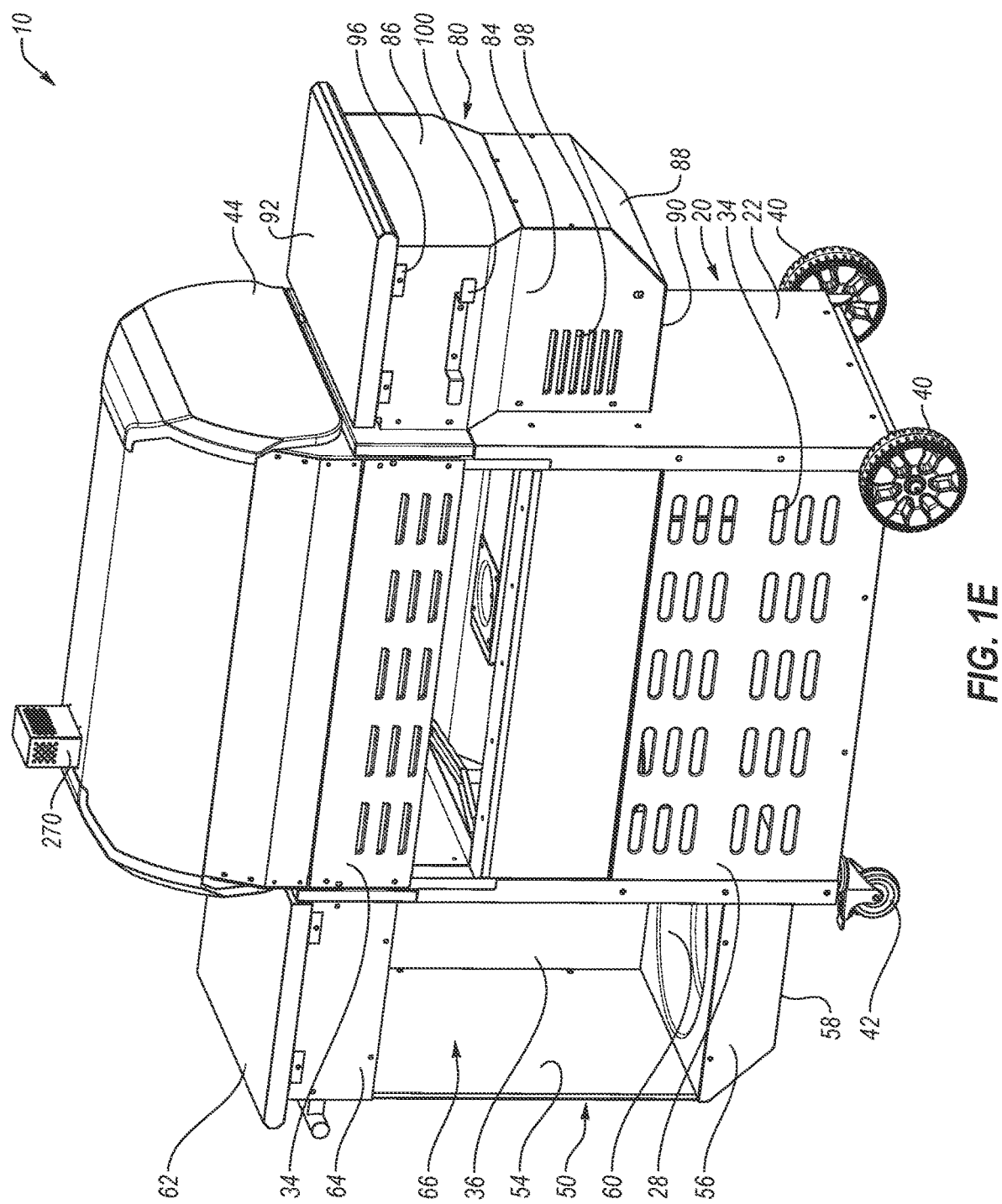
FIG. 1E is still another rear perspective view of the exemplary cooking device shown in FIG. 1A, illustrating the drawer, baffle, and/or drip tray removed from the cooking device.

As mentioned above, the cooking device 10 may include a drawer 36 and the drawer may be disposed in a rear portion 28 of the enclosure 20. As seen in FIGS. 1C-1E, the drawer 36 may be movable and/or removable. The drawer 36 may include one or more handholds 200 and the handholds may facilitate movement of the drawer.

Figure 2A:
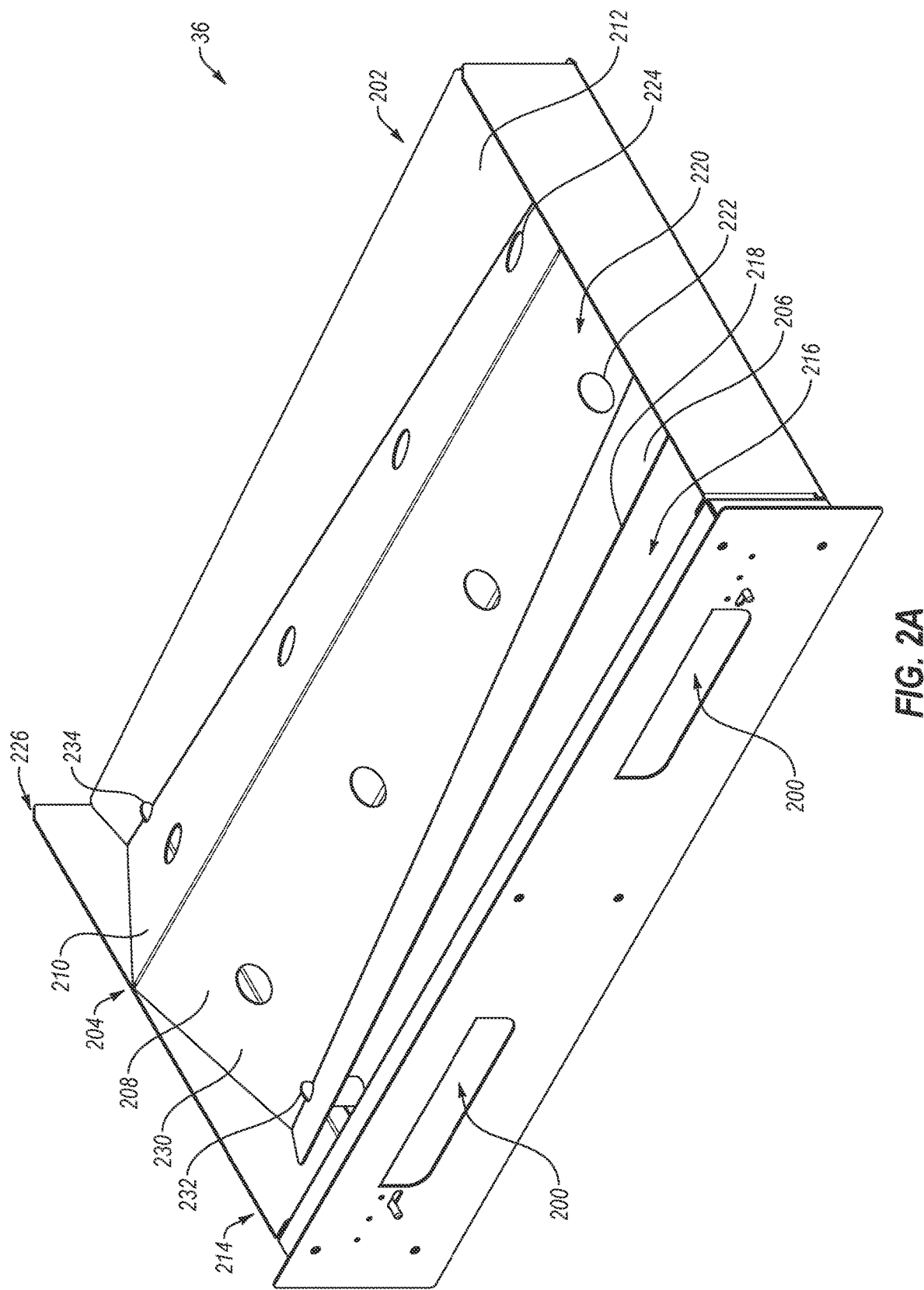
FIG. 2A is an upper perspective view of an exemplary component for a cooking device, illustrating an exemplary drawer, baffle, and/or drip tray.
Figure 2B:
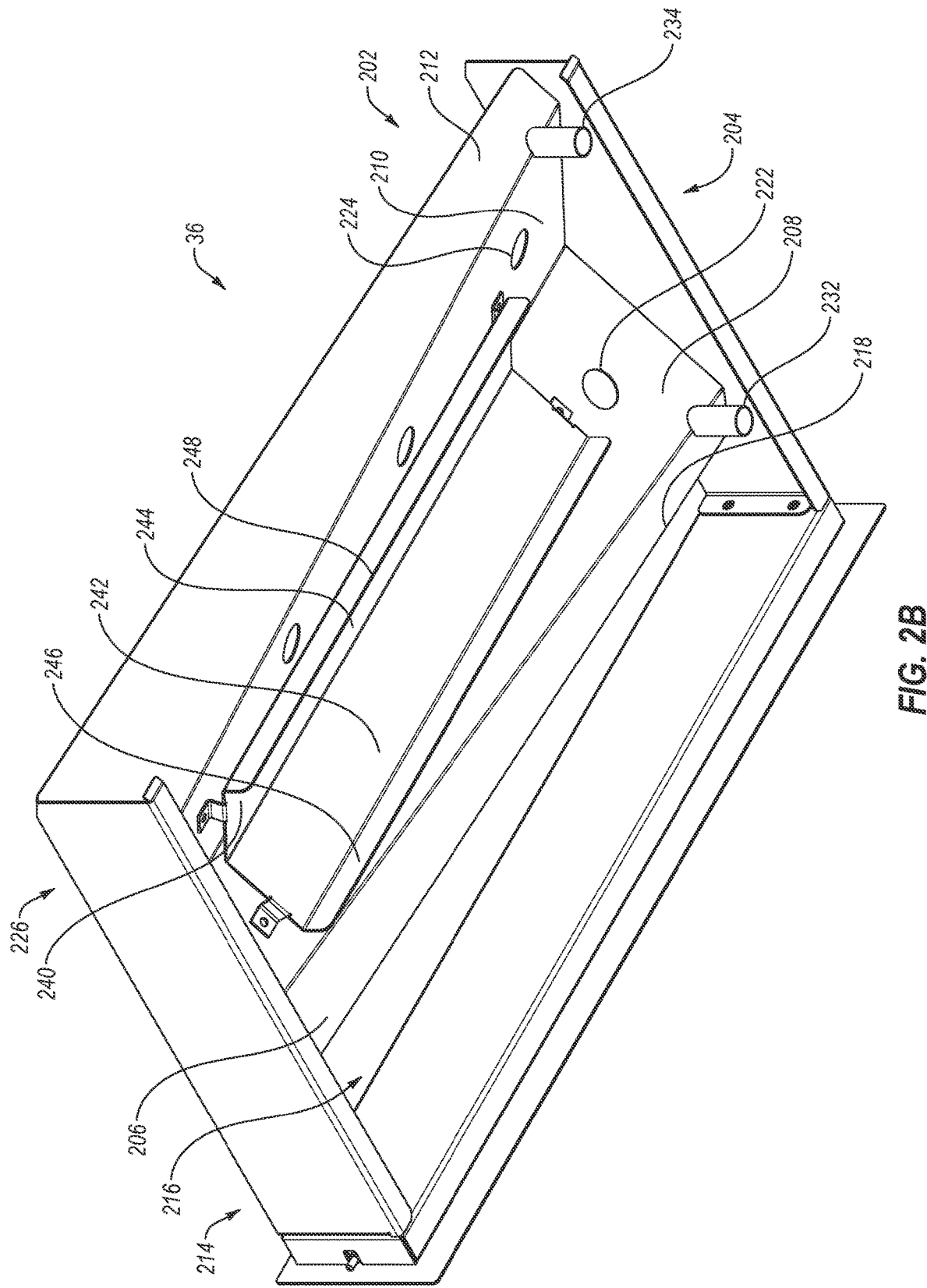
FIG. 2B is a lower perspective view of the exemplary drawer, baffle, and/or drip tray shown in FIG. 2A.

The drawer 36 may be part of a heat and/or smoke distribution system 202. As shown in FIGS. 2A and 2B, the drawer 36 may include one or more baffles 204 and the baffles may help distribute heat and/or smoke within the cooking chamber 18. For example, the baffle 204 may include one or more sections, such as a first section 206, a second section 208, a third section 210, and a fourth section 212. The first section 206 may be disposed at least proximate a front portion 214 of the drawer 36 and the first section may be disposed at an angle. A gap or opening 216 may be disposed between the front portion 214 of the drawer 36 and a first portion 218, such as a leading edge, of the first section 206 of the baffle 204. The gap 216 may be sized and configured to help distribute heat and/or smoke within the cooking chamber 18. For example, the gap 216 may have a relatively constant size between the front portion 214 of the drawer 36 and the first portion 218 of the baffle 204, which may allow a desired amount of heat and/or smoke from the second heat source 14 to traverse the gap. The relatively constant sized gap 216 may allow a generally uniform amount of heat and/or smoke to flow toward the cooking structure 16, which may allow foodstuffs to be more evenly heated, cooked, and/or smoked. In particular, because the gap 216 may have a relatively constant size, a generally uniform flow of air, thermal energy, and/or smoke may traverse the gap, which may enable a more uniform flow of heat and/or smoke to foodstuffs placed on the cooking structure 16.

The gap 216 may also be larger and/or smaller depending, for example, upon the desired about of airflow, thermal energy, and/or smoke from the second heat source 14. In addition, the gap 216 may not have a generally constant size. For example, the gap 216 may vary in size and shape, and the gap may be sized and configured to provide more uniform flow of air, thermal energy, and/or smoke. For example, because the burn pot 130 may be generally centrally disposed, a central portion of the gap 216 may be smaller to help push heat and/or smoke towards the sides of the gap, which may result in more uniform distribution of airflow, thermal energy, and/or smoke. The gap 216 could also have an irregular size and it may be designed to concentrate heat and/or smoke in one or more areas. For instance, the gap 216 may be sized and configured to concentrate heat and/or smoke towards the back and/or front of the cooking chamber 18 to create a desired flow of heat and/or smoke within the cooking chamber. The gap 216 may be part of the heat and/or smoke distribution system 202.

The first section 206 of the baffle 204 may be disposed at an angle such as between about 10 degrees and about 45 degrees, between about 15 degrees and about 40 degrees, between about 20 degrees and about 35 degrees, between about 25 degrees and about 30 degrees, and the like. The angle of the first section 206 of the baffle 204 may be selected to facilitate heat and/or smoke distribution within the cooking chamber 18.

The second section 208 of the baffle 204 may be connected to the first section 206 of the baffle. The first and second sections 206, 208 of the baffle 204 may be disposed in a generally V-shaped configuration. The second section 208 of the baffle 204 may be disposed at an angle such as between about 10 degrees and about 45 degrees, between about 15 degrees and about 40 degrees, between about 20 degrees and about 35 degrees, between about 25 degrees and about 30 degrees, and the like. The angle of the second section 208 of the baffle 204 may be selected to facilitate heat and/or smoke distribution within the cooking chamber 18.

The third section 210 of the baffle 204 may be connected to the second section 208 of the baffle. The second and third sections 208, 210 of the baffle 204 may be disposed in a generally inverted V-shaped configuration. The third section 210 of the baffle 204 may be disposed at an angle such as between about 10 degrees and about 45 degrees, between about 15 degrees and about 40 degrees, between about 20 degrees and about 35 degrees, between about 25 degrees and about 30 degrees, and the like. The angle of the third section 210 of the baffle 204 may be selected to facilitate heat and/or smoke distribution within the cooking chamber 18.

The fourth section 212 of the baffle 204 may be connected to the third section 210 of the baffle. The third and fourth sections 210, 212 of the baffle 204 may be disposed in a generally V-shaped configuration. The fourth section 212 of the baffle 204 may be disposed at an angle such as between about 10 degrees and about 45 degrees, between about 15 degrees and about 40 degrees, between about 20 degrees and about 35 degrees, between about 25 degrees and about 30 degrees, and the like. The angle of the fourth section 212 of the baffle 204 may be selected to facilitate heat and/or smoke distribution within the cooking chamber 18. It will be appreciated that the drawer 36 may have any suitable number of sections and the sections could have different shapes, sizes, configurations, and/or arrangements depending, for example, upon the intended use of the cooking device 10.

The drawer 36 may include one or more openings 220 and the openings may be part of the heat and/or smoke distribution system 202. For example, the drawer 36 may include a first plurality of openings 222 and these openings may be disposed in the second section 208 of the baffle 204. The drawer 36 may include a second plurality of openings 224 and these openings may be disposed in the third section 210 of the baffle 204. The first plurality of openings 222 may be generally aligned and may have generally the same size and shape. The first plurality of openings 222 may be disposed in a row and the openings may be spaced generally equidistant. In particular, in the exemplary embodiment shown in FIGS. 2A and 2B, the first plurality of openings 222 may include four (4) openings, the openings may be generally spaced an equal distance apart, and the openings may be generally aligned along a first axis that extends across the baffle 204. The second plurality of openings 224 may be generally aligned and may have generally the same size and shape. The second plurality of openings 224 may be disposed in a row and the openings may be spaced generally equidistant. The second plurality of openings 224 may include four (4) openings, the openings may be generally spaced an equal distance apart, and the openings may be generally aligned along a second axis that extends across the baffle 204.

The openings 220, 222, and/or 224 may be sized and configured to distribute heat and/or smoke within the cooking chamber 18. For instance, the openings 220, 222, and/or 224 may be sized and configured to allow a desired amount of heat and/or smoke from the second heat source 14 to flow towards the cooking structure 16. The uniform spacing of one or more of the openings 220, 222, and/or 224 may facilitate generally uniform heat and/or smoke distribution with in the cooking chamber 18. As shown in FIG. 2, the openings 220, 222, and/or 224 may not be spaced directly above the burn pot 230. Instead, one or more of the openings 220, 222, and/or 224 may be generally aligned or disposed about an outer edge or periphery of the burn pot 230. It will be appreciated that the drawer 36 may have any suitable number of openings 220, 222, and/or 224, and the openings could be disposed in different locations and the openings may have other shapes, sizes, configurations, and/or arrangements depending, for example, upon the intended use of the cooking device 10.

When the drawer 36 is closed, a rear portion 226 of the drawer 36 may contact an inner surface of the enclosure 20. In this exemplary embodiment, the rear portion 226 of the drawer 36 may form at least a partial seal with the inner surface of the enclosure 20, which may at least partially prevent the flow of heat and/or smoke from the second heat source 14 toward the cooking structure 16. The rear portion 226 of the drawer 36 may also be spaced apart from the inner surface of the enclosure 20, which may allow heat and/or smoke from the second heat source 14 to flow towards the cooking structure 16. Thus, for example, the drawer 36 may be sized and configured to allow heat and/or smoke to flow about front and/or rear portions of the baffle 204. In addition, the openings 220, 222, and/or 224 may allow heat and/or smoke to flow through one or more portions of the baffle 204. Accordingly, heat and/or smoke may flow through around a front portion of the baffle, through a middle portion of the baffle, and/or around a rear portion of the baffle. Therefore, the baffle 204 may facilitate heat and/or smoke distribution within the cooking chamber 18 and the baffle may be part of the heat and/or smoke distribution system 202. Advantageously, the baffle 204 may allow heat and/or smoke to flow more uniformly and/or consistently within the cooking chamber 18, which may allow more even heating, cooking, and/or preparing of foodstuffs.

Alternatively, or in combination with the heat and/or smoke distribution system 202 and/or the baffle 204, the drawer 36 may include or form at least a portion of a drip tray 230. The drip tray 230 may be sized and configured, for example, to collect drippings from foodstuffs. Advantageously, the drawer 36. the drip tray 230, and/or the baffle 204 may be part of the same structure. In addition, the drawer 36, the drip tray 230, and/or the baffle 204 may perform multiple functions. For example, the drip tray 230 may be at least partially constructed from the first, second, third, and/or fourth sections 206, 208, 210, 212 of the baffle 204. For example, the first and second sections 206, 208 of the baffle 204 may have a generally V-shaped configuration and the lower portion of the V-shaped section may be disposed at a slope. Similarly, the third and fourth sections 210, 212 of may be disposed in a generally V-shaped configuration and the lower portion of the V-shaped section may be disposed at a slope. As shown in FIGS. 2A and 2B, both of the lower portions may be sloped in the same direction, such as to one side of the baffle 204. Drippings collected on the drip tray 230 may traverse down the slopes towards openings 232, 234, and the openings may be disposed towards a side of the drip tray and/or drawer 36. The drippings may flow through the openings 232, 234 and down one or more pathways 236 to a collector such as a container or bucket 238. The bucket 238 may facilitate removal of the drippings and other materials from the cooking device 10.

As seen in FIG. 2B, the cooking device 10 may include a diffuser or heat shield 240. The diffuser 240 may be connected to the drawer 36, the baffle 204, and/or the drip tray 230. The diffuser 240 may be generally centrally disposed and at least a portion of the diffuser may be generally vertically aligned with the burn pot 130. The diffuser 240 may be sized and configured to redirect and/or redistribute heat and/or smoke from the second heat source 14. For example, the diffuser 240 may redirect at least a portion of the heat and/or smoke from the second heat source 14 away from a center portion of the baffle 204. The diffuser 240 may also distribute or allow heat and/or smoke from the second heat source to contact the baffle 204 more evenly. The diffuser 240 may also help prevent hotspots, such as the area directly above the burn pot 130. As shown in FIG. 2B, the diffuser 240 may be vertically aligned with a center portion of the baffle 204, such as a portion of the second section 208 and/or a portion of the third section 210 of the baffle. The diffuser 240 may also be vertically aligned with one or more openings in the baffle 204, such as one or more of the openings 220, 222, and/or 224.

The diffuser 240 may have a generally V-shaped configuration with a first side 242 and a second side 244. A first flange 246 may extend outwardly from the first side 242 and a second flange 248 may extend outwardly from the second side 244. The diffuser 240 may be spaced apart from the baffle 204 by a distance and the diffuser may be connected to the baffle 204 by one or more fasteners. The diffuser 240 may be constructed from a heat resistant material because it may be disposed directly above the burn pot 130 of the second heat source 14.

The diffuser 240 may have a generally V-shaped configuration and the V-shaped configuration may facilitate redirection of thermal energy and/or smoke from the second heat source 14. For example, the first side 242 and/or the second side 244 may be angled to direct thermal energy and/or smoke outwardly and towards one or more sides of the baffle 204 and/or the cooking chamber 18. The diffuser 240 may help direct thermal energy and/or smoke towards one or more pathways through and/or around the baffle 204, such as through various gaps or openings, including the gap 216 and/or the openings 220, 222, and/or 224. Therefore, the diffuser 240 may be part of the heat and/or smoke distribution system 202.

Advantageously, the drawer 36, the baffle 204, the drip tray 230, and/or the diffuser 240 may be multi-functional. For example, the drawer 36, the baffle 204, the drip tray 220, and/or the diffuser 240 may facilitate heat and/or smoke distribution within the cooking chamber 18, and may be part of the heat and/or smoke distribution system 202. The drawer 36, the baffle 204, the drip tray 230, and/or the diffuser 240 may be part of a unitary, one-piece structure. The drawer 36, the baffle 204, and/or the diffuser 240 may also be one or more separate or independent structures, if desired. If the drawer 36 is removable, the baffle 204, the drip tray 230, and/or the diffuser 240 may be more easily maintained and cleaned.

After reviewing this disclosure, one skilled in the art will understand the drawer 36, the heat and/or smoke distribution system 202, the baffle 204, the drip tray 230, and/or the diffuser 240 may have other suitable shapes, sizes, configuration, and/or arrangements. The cooking device 10 may also include any suitable number of drawers, baffles, baffle sections, openings, diffusers, drip trays, and other components depending, for example, upon the size and configuration of the cooking device 10.

The drip tray 230 may be movable and/or removable because it may be attached to the drawer 36. The drip tray 230, however, does not have to be attached to the drawer 36 and the drawer may be sized and configured to provide access to the drip tray. The removable and/or easy access to the drip tray 230 may be a significant improvement over a conventional wood pellet-burning BBQ. For example, a drip tray for a traditional wood pellet-burning BBQ is typically enclosed within a cooking volume and difficult to access. For instance, multiple parts and components of a traditional wood pellet-burning BBQ may have to be removed to access the drip tray. Because the drawer 36 and/or the drip tray 230 may simply slide in and out, the drip tray and/or interior portion of the cooking device 10 may be easily cleaned and sanitized.

In addition, the drip tray for a traditional wood pellet-burning BBQ is typically a large planar structure that extends across the entire system and is sloped to one side. The size and sloped surface of the drip tray causes uneven distribution of heat and smoke. For example, the drip tray of a traditional wood pellet-burning BBQ often causes heat and/or smoke to be concentrated in particular areas, which may result in uneven cooking and smoking of foodstuffs. The drip tray 230 of the cooking device 10, on the other hand, may facilitate uniform distribution of heat and/or smoke, as discussed above, which may result in more uniform cooking and/or smoking of foodstuffs.

As shown in FIG. 1C, when the drawer 36 is closed, the drawer may be generally aligned with the rear portion 28 of the enclosure 20. The drawer 36 may form an at least substantial seal and the seal may help prevent the inadvertent loss of heat and/or smoke from the cooking chamber 18. Thus, the drawer 36 may help retain heat and/or smoke within the cooking chamber 18. A substantially sealed cooking chamber 18 may be very useful during the smoking process. For example, the cooking chamber 18 may be more quickly heated and heat may be more efficiently retained if the cooking chamber 18 is at least substantially sealed. In contrast, traditional gas-powered BBQ grills often include large openings because, for example, of the high heat created by the gas burners.

As discussed above, the first heat source 12 may be a gas-powered grill and the first heat source may be controllable via one or more valves 250. The valves 250 may be disposed along the front portion 26 of the cooking device 10. The valves 250 may control gas flow to one or more of the burners 252. The exemplary first heat source 12 shown in the accompanying figures includes four valves 250 and four burners 252. The burners 252 may extend generally from the front portion 26 to the rear portion 28 of the cooking device 10. The burners 252 may be positioned such that thermal energy emitted from the first heat source 12 is distributed across at least substantially all of the cooking structure 16. The burners 252 may be disposed generally evenly and uniformly below the cooking structure 16, and the burners may be disposed a generally constant distance from the cooking structure 16, It will be appreciated that the first heat source 12 may include any suitable number of burners 252 and the burners may have different shapes, sizes, configurations, and/or arrangements depending, for example, upon the intended use of the cooking device 10.

The burners 252 may be at least partially covered by one or more heat tents 254. The heat tents 252 may prevent drippings and other objects from contacting the burners 252. The heat tents 254 may also distribute heat supplied by the burners 252. For example, the heat tents 254 may be positioned such that thermal energy emitted from the burners 252 is distributed across at least substantially all of the cooking structure 16. Additionally, the heat tents 254 may more evenly distribute thermal energy across the cooking structure 16. In the exemplary embodiment shown in the accompanying figures, the four burners 252 may be covered by four heat tents 254, and each of the heat tents may be sized and configured to help distribute thermal energy from the burners 252 across at least substantially all the cooking structure 16. For instance, a first burner 252 and a first heat tent 254 may distribute thermal energy directly to a first portion of the cooking structure 16. Similarly, the second, third, and fourth burners 252 and accompanying heat tents 254 may distribute thermal energy directly to second, third, and fourth portions of the cooking structure 16. Accordingly, the burners 252 and/or heat tents 254 may provide direct heat to at least substantially all the cooking structure 16 and the heat may be distributed at least generally evenly across all the cooking structure.

After reviewing this disclosure, one skilled in the art will be appreciated that the first heat source 12 may include any number and combination of burners 252 and heat tents 254. Additionally, the first heat source 12 and/or one or more of the burners 252 may be automatically controlled. The first heat source 12 may also include other components or features, such as a diffuser, and the first heat source may provide other types of heat such as infrared.

The first heat source 12 may supply thermal energy at a high rate and/or direct heat to the cooking chamber 18. For instance, the first heat source 12 may supply thermal energy at a high temperature and/or high rate (e.g., about 15,000 British thermal units per hour (BTU/H) to about 60,000 BTU/H). Thus, the first heat source 12 may be configured to bring the cooking chamber 18 to a particular temperature quickly. In contrast, the second heat source 14 may supply thermal energy at a low rate and/or indirectly to the cooking chamber 18. The second heat source 14 may take a longer time to heat the cooking chamber 18 and may operate at a lower temperature than the first heat source.

The cooking device 10 may include an unburned gas vent assembly 260 and the unburned gas vent assembly may allow unburned gas to be vented or removed from the cooking chamber 18. The unburned gas vent assembly 260 may include one or more gutters 262 disposed within the cooking chamber 18. The gutters 262 may allow unburned gas to be removed from the cooking chamber 18. The gutters 262 may also improve and/or provide more consistent airflow within the cooking chamber 18. In addition, the gutters may prevent unintended airflow or fast-moving air currents from impacting the burners 252, which may prevent the burners from being unintentionally or inadvertently extinguished. Exemplary embodiments of an unburned gas vent assembly and gutters are shown in Untied States Patent Publication No. 2020-0305642, which is incorporated by reference in its entirety.

Figure 6:
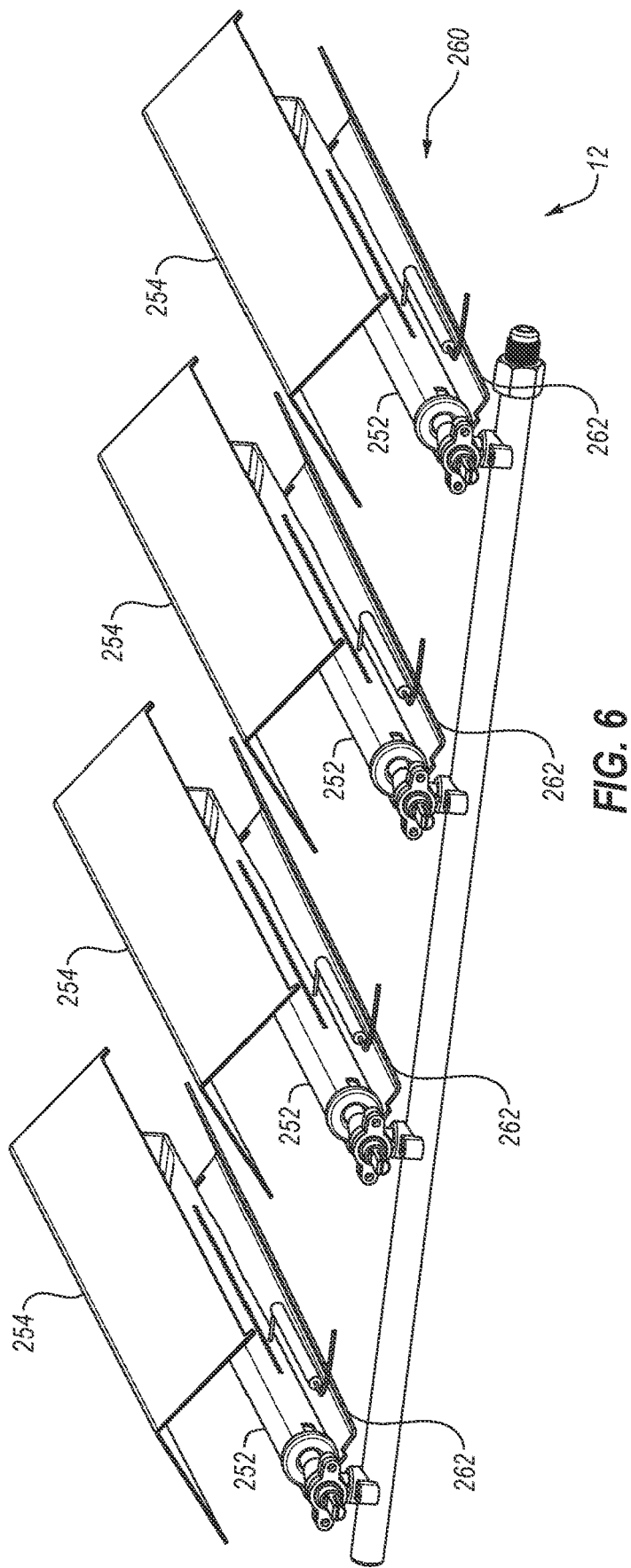
FIG. 6 is a perspective view of an exemplary heat source for a cooking device, illustrating a gas-powered heat source.
Figure 7A:
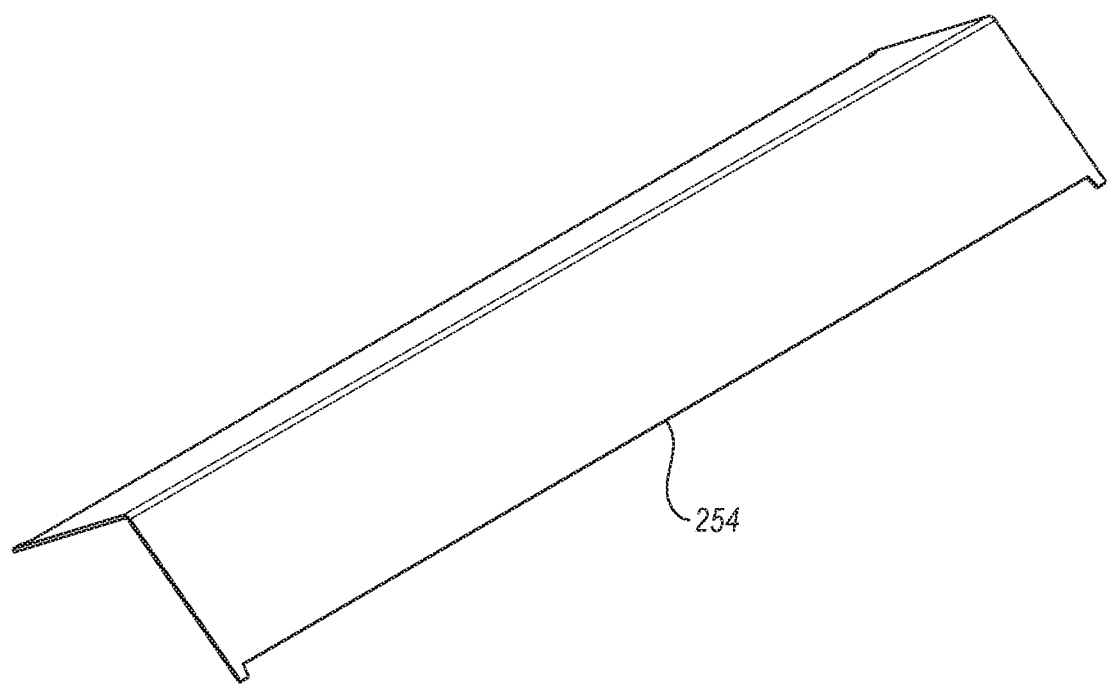
FIG. 7A is an upper perspective view of an exemplary component for an exemplary cooking device, illustrating an exemplary heat tent.
Figure 7B:
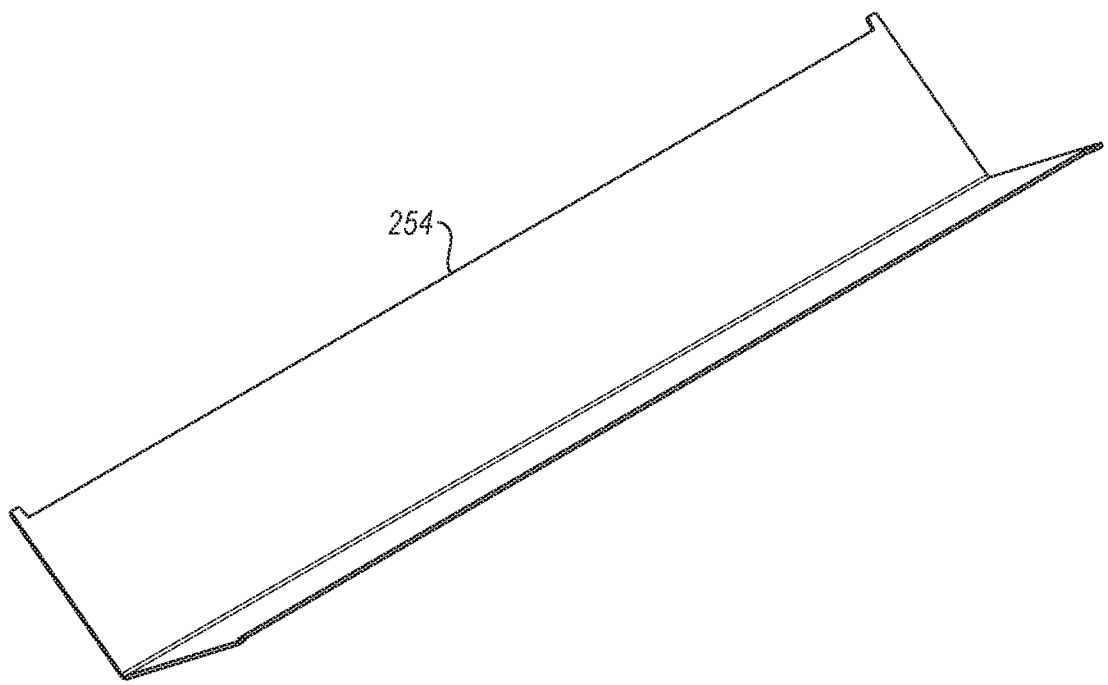
FIG. 7B is a lower perspective view of the exemplary heat tent shown in FIG. 7A.
Figure 8A:
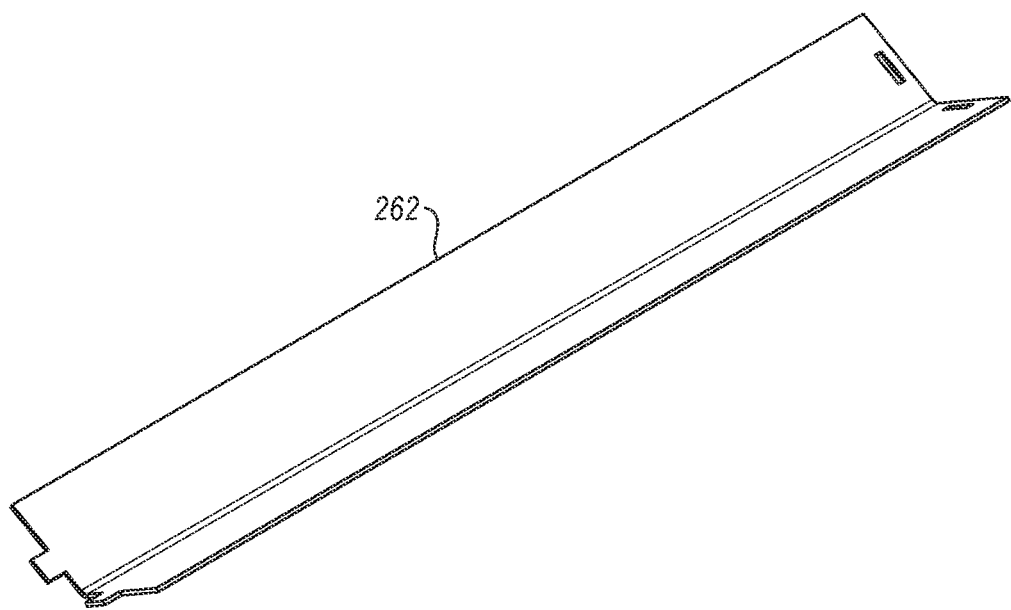
FIG. 8A is an upper perspective view of an exemplary component for an exemplary cooking device; illustrating an exemplary gutter that may be part of an unburned gas vent assembly.
Figure 8B:
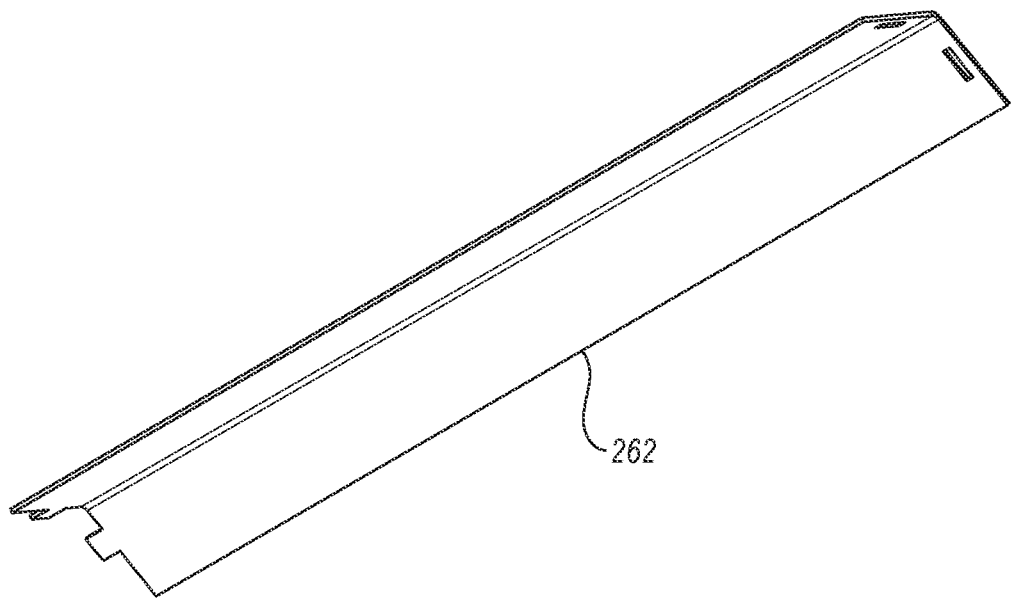
FIG. 8B is a lower perspective view of the exemplary gutter shown in FIG. 8A.

As seen in FIGS. 3A and 6, the unburned gas vent assembly 260 may be sized and configured to collect unburned gas from the burners 252. The vent assembly 260 may then be sized and configured to vent or remove at least a portion of the collected unburned gas from the cooking chamber 18.

As shown in the accompanying figures, each burner 252 may include a gutter 262 and the gutter may be disposed underneath the burner. In addition, a heat tent 254 may be disposed above each burner 252. Thus, each burner 252 may be disposed between a heat tent 254 and a gutter 262. Because the cooking device 10 may use gasses that are heavier than air, such as propane, unburned gas may exit the burner 252 and fall or sink into the gutter 262.

In the exemplary embodiment shown in FIGS. 3A and 6, the unburned gas vent assembly 260 may include one gutter 262 positioned below each burner 252. Each gutter 262 may collect unburned gas from the corresponding burner 252. In other exemplary embodiments, the vent assembly 260 may include one gutter that is placed below two or more burners 252. Additionally, in some exemplary embodiments, more than one gutter 262 may be positioned relative to one of the burners 252. For instance, two or more gutters 262 may be positioned below one of the burners 252. After reviewing this disclosure one of ordinary skill in the art will appreciate that the unburned gas vent assembly 260, the burners 252, the gutters 262, etc. may have other shapes, sizes, configurations, and/or arrangements depending, for example, upon the intended use of the cooking device 10.

The unburned gas vent assembly 260 may include and/or be in fluid communication with one or more vents, such as the vents 34 disposed in the rear portion 28 of the enclosure 20. For example, one or more of the vents 34 may be positioned at an end of one or more of the gutters 262 and the vents may be in fluid communication with the gutters. This may allow unburned gas to flow along the gutters 262 and exit the cooking chamber 18 via the vents 34. Thus, the vents 34 may provide ventilation, cooling, airflow, etc. to one or more portions of the cooking chamber 18 and/or the enclosure 20, and one or more of the vents may allow unburned gas to exit the cooking chamber.

The gutters 262 may be configured or arranged relative to the vent 34 to enable passive removal of the unburned gas. For instance, the gutters 262 may be sloped to enable the unburned gas to exit the cooking chamber 18 via the vents 34. As shown in the accompanying figures, the gutters 262 may be sloped from the front portion 26 of the enclosure 20 to the rear portion 28 of the enclosure 20. In other embodiments, the gutters 262 may be sloped in other directions. For instance, the gutters 262 may extend to the first side 22, the second side 24, the front portion 26, and/or the rear portion 28 of the enclosure 20. The sloped gutters 262 may facilitate passive removal of the unburned gas. It will be appreciated that fans, blowers, and other devices may be used to actively remove the unburned gas from the cooking chamber 18.

As shown in the accompanying figures, the gutters 262 may be at least partially positioned below the burners 252. The gutters 262 may also be disposed about and/or positioned around at least a portion of the burners 252. For instance, the gutters 262 may surround at least a portion of the sides and/or bottom portions of the burner 252. After reviewing this disclosure, one of ordinary skill in the art will appreciated that the burners 252 and/or the gutters 262 may have other suitable shapes, sizes, configurations, and/or arrangements depending, for example, upon the intended use of the cooking device 10.

The gutters 262 may form at least a portion of one or more levels or layers within the cooking device 10. In an exemplary embodiment, one or more of these levels may be disposed within the cooking chamber 18 and these levels may be disposed in a stacked or vertically arranged configuration. For example, the cooking chamber 18 may include a first level, such as a lower level, that includes at least a portion of a heat source. For instance, the first level may include at least a portion of the second heat source 14, such as the burn pot 130. Another level within the cooking chamber 18, such as a second level, may include the diffuser 240, which may be located at least partially above the level with the burn pot 130. Still another level within the cooking chamber 18, such as a third level, may include the drip tray 230 and the drip tray may be located at least partially above the diffuser 240. Yet another level within the cooking chamber 18, such as a fourth level, may include the gutters 262 and the gutters may be disposed at least partially above the drip tray 230. Still yet another level within the cooking chamber 18, such as a fifth level, may include the burners 252 and the burners may be disposed at least partially above the gutters 262. A further level within the cooking chamber 18, such as a sixth level, may include the heat tents 254 and the heat tents may be disposed at least partially above the burners 252. A still further level within the cooking chamber 18, such as a seventh level, may include the cooking structure 16 and the cooking structure may be disposed at least partially above the heat tents 254. Advantageously, the different levels may facilitate use of two different fuels sources and the different levels may facilitate more even and/or uniform distribution of heat and/or smoke within the cooking chamber 18. It will be appreciated that the cooking device 10 may include any desired number of levels and the cooking device may include additional levels. Further, one or more levels may be combined. For example, the drip tray 230 and the diffuser 240 may be combined into a single structure. It will also be appreciated that the levels may have various shapes, sizes, configurations, and/or arrangements depending, for example, upon the intended use of the cooking device 10.

Figure 10:
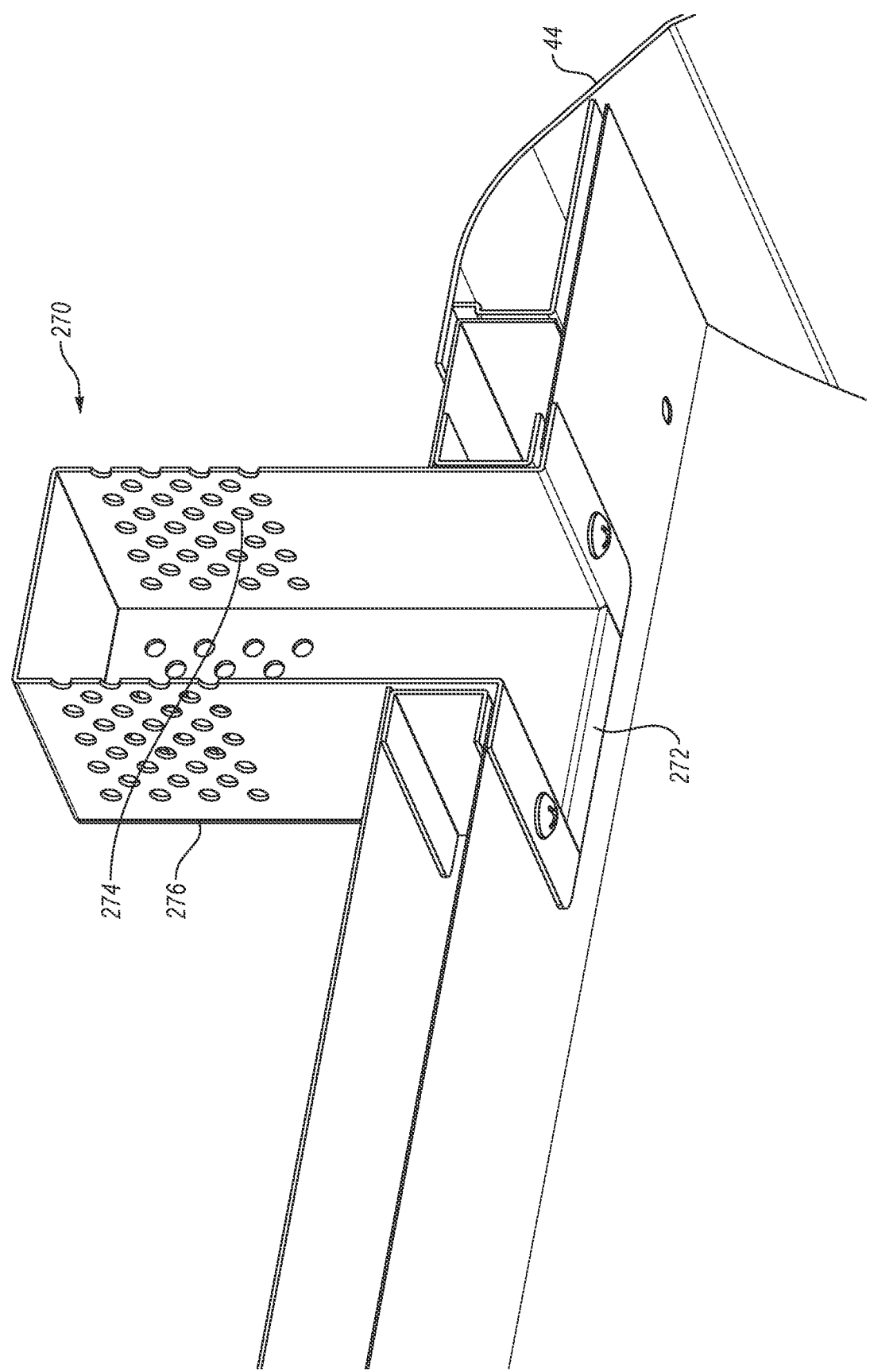
FIG. 10 is an upper, partial cutaway perspective view of an exemplary chimney for a cooking system.

The cooking device 10 may include a chimney 270 and the chimney may be connected to the lid 44. As shown in FIG. 10, the lid 44 may include inner and outer surfaces, inner and outer surfaces of the lid may be separated by a distance. Thus, a gap or opening may be disposed between the inner and outer surfaces of the lid 44. The spaced apart inner and outer surfaces of the lid 44 may help retain heat within the cooking chamber 18, and the spaced apart inner and outer surfaces may help keep the outer surface of the lid 44 cool. Insulation or other materials may be disposed between the inner and outer layers of the lid 44, if desired.

The chimney 270 may be connected to the lid 44. In particular, the chimney 270 could be connected to the inner and/or outer surfaces of the lid 44. For example, as seen in FIG. 10, the chimney 270 may include a base 272 that is attached to the inner surface of lid 44 by one or more fasteners, such as screws, rivets, welds, and the like. The chimney 270 may extend upwardly through an opening in the outer surface of the lid. The chimney 270 and/or the lid 44 may be supported by one or more brackets, such as the generally C-shaped brackets shown in FIG. 10.

The chimney 270 may be connected to the upper surface of the lid 44. The chimney 270, however, may not be connected to the upper surface of the lid 44 and the chimney may be spaced apart from the upper surface of the lid by a gap. If the chimney 270 is not directly connected to the upper surface of the lid 44, the upper surface of the lid may by cooler.

The chimney 270 may have a generally rectangular configuration with four sidewalls and a top. The chimney 270 may be in fluid communication with the cooking chamber 18, and the amount of fluid communication between the chimney and the cooking chamber may be adjustable. For example, the chimney 270 may provide a larger amount of airflow and/or ventilation during the grilling process. Alternatively, the chimney 270 may provide a smaller amount of airflow and/or ventilation during the smoking process, which may help retain more heat and/or thermal energy within the cooking chamber 18.

The chimney 270 may include one or more openings 274 and one or more of the openings may be disposed in one or more of the sidewalls of the chimney. As shown in FIG. 10, for example, a first plurality of the openings 274 may be disposed in a first side of the chimney 270. Similarly, a second plurality of openings 274 may be disposed in a second side of the chimney 270, a third plurality of openings may be disposed in a third side of the chimney, and a fourth plurality of openings may be disposed in a fourth side of the chimney. As shown in the accompanying figures, the openings 274 may be disposed in an upper portion 276 of the chimney 270.

The openings 274 may be sized and configured to allow a portion of the heat and/or smoke to be vented from the cooking chamber 18. In an exemplary embodiment, the chimney 270 may be part of the heat and/or smoke distribution system 202. For example, the chimney 270 may be sized and configured to create more uniform airflow within the cooking chamber 18. The chimney 270 may also be sized and configured to create more uniform temperature distribution within the cooking chamber 18. For instance, the chimney 270 may be sized and configured to draw air along the sides of the cooking chamber 18, which may facilitate more uniform airflow and/or more uniform temperature distribution within the cooking chamber. After reviewing this disclosure, it will be appreciated that the chimney 270 may have other suitable shapes, sizes, configurations, and/or arrangements depending, for example, upon the intended use of the cooking device 10.

In operation or use of an exemplary embodiment of the cooking device 10, a user may preheat the cooking chamber 18 by turning on the first and/or second heat sources 12, 14. Preheating, however, is not required. The user may place foodstuffs on the cooking structure 16 and the lid 44 may be opened and/or closed depending, for example, upon the desired cooking technique. The first and/or second heat sources 12, 14 may be used to warm, prepare, and/or cook the foodstuffs, and the first and second heat sources may be manually and/or automatically controlled. For example, the user may manually turn the values 250 to the burners 252 to control the first heat source 12. The use may also provide one or more inputs to the controller 160 and the controller may automatically or semi-automatically control the first and/or second heat sources 12, 14.

The operation or use of the cooking device 10 may include use of one or more sensors, such as the heat probes or thermocouples. The sensors may include, as discussed above, one or more sensors 134 disposed at least proximate the burn pot 130 and one or more sensors 196 disposed at least proximate the cooking structure 16. One or more sensors may also be placed in other desired portions of the cooking device, such as in the cooking chamber 18, proximate the burners 252, etc. For example, one or more sensors 280 may be disposed in the lid 44, one or more sensors 282 may be disposed proximate the burners, and one or more sensors 284 may be disposed at least proximate the cooking structure 16. One or more of these sensors (e.g., 134, 196, 280, 282, and/or 284) may be part of a temperature feedback loop. One or more of these sensors (e.g., 134, 196, 280, 282, and/or 284) may also be connected to the controller 160, which may facilitate more precise cooking, automatic control of one or more systems, and the like. It will be appreciated that any suitable number sensors may be disposed in one or more locations and may be used as part of one or more control systems.

The operation of the cooking device 10 may facilitate preparation of foodstuffs via different cooking techniques and/or multiple fuel sources, and the cooking device may provide improved temperature control within the cooking chamber 18. For example, while known wood pellet-burning BBQs may be able to determine the temperature in a cooking volume, traditional wood pellet-burning BBQs do not know if pellets are being combusted in the burn pot or, if pellets are being combusted, the amount of thermal energy being generated at the burn pot. The one or more sensors 134 disposed at least proximate the burn pot 130 may determine, for example, if the burn pot is active and the amount of thermal energy being created. Thus, instead of waiting for a significant temperature change to occur in the cooking volume like a traditional wood pellet-burning BBQ, the cooking device 10 can anticipate temperature changes in the cooking chamber 18 and, for example, add a desired number of pellets to the burn pot 130. This may allow more precise temperature control within the cooking chamber 18.

The cooking device 10 may also facilitate improved temperature control and/or management during both grilling and smoking process. For example, by measuring temperature at one or more locations, such as at the cooking structure 16, the cooking chamber 18, the burn pot 130, and/or the burners 252, the cooking device 10 may more accurately determine the cooking temperature of foodstuffs while grilling and/or smoking. In addition, the cooking device 10 may use the same sensors when grilling and/or smoking. Because the cooking device 10 may know the temperature at one or more locations and the amount of thermal energy being produced by multiple fuel sources, the cooking device may precisely determine the amount of thermal energy being provided to the foodstuffs. Thus, in an exemplary embodiment, the cooking device 10 may include a first sensor (e.g., sensor 282) to determine the temperature and/or thermal energy at or at least proximate the first heat source 12, a second sensor (e.g., sensor 134) to determine the temperature and/or thermal energy at least proximate the second heat source 14, a sensor (e.g., sensor 196 and/or sensor 284) to determine the temperature at least proximate the cooking structure 16, and/or a sensor to determine the temperature within the cooking chamber 18 (e.g., sensor 280). This information may be used, for example by the controller 160, to provide improved temperature control, which may facilitate more exact cooking of foodstuffs.

The cooking device 10 may also provide improved heat and/or smoke distribution within a single cooking chamber 18 that is powered by a first heat source 12 and a second heat source 14. For example, the cooking chamber 18 may be sized and configured to facilitate smoking, which may involve indirect heating from the second heat source 14 and a primarily or at least substantially sealed cooking chamber. The cooking chamber 18 may also be sized and configured to facilitate gas-powered grilling with the first heat source 12, which may involve direct heating and substantial ventilation of the cooking area. Advantageously, the cooking chamber 18 may be sized and configured to provide proper ventilation during both the smoking and grilling processes (e.g., by one or more vents, such as vents 34, and/or the chimney 270).

The chimney 270 may be sized and configured to provide proper airflow and/or ventilation during the smoking and grilling processes. The chimney 270 may allow the airflow and/or ventilation to be adjustable. For example, the chimney 270 may be sized and configured to allow a limited amount of airflow and/or ventilation during smoking processes, but the chimney may allow increased airflow and/or ventilation during gas-powered grilling processes. One or more vents, such as the vents 34, may also help control airflow and/or ventilation during gas-powered grilling and/or smoking processes. Therefore, the cooking device 10 may use two different fuel sources, allow at least two different cooking styles or techniques to be utilized, and the same cooking chamber 18 may be sized and configured for cooking, preparing, and/or warming foodstuffs using high-high or low-heat fuel sources, direct or indirect heating, more or less airflow and/or ventilation, smoking of the foodstuffs or not smoking the foodstuffs, etc. Moreover, the cooking device 10 may be sized and configured to provide even, consistent, and/or uniform control of heat and/or smoke within the cooking chamber 18 by controlling the heat and/or smoke generated by the burn pot 130 (e.g., by the feed system 112, the heating element 132, and/or the sensor 134), the diffuser 240, the drip tray 230, the gutters 262, the burners 252, the heat tents 254, and/or the sensors (e.g., the sensors 134, 280, 282, and/or 284).

After reviewing this disclosure, one of ordinary skill in the art will understand that modifications, additions, or omissions may be made to the cooking device 10 without departing from the scope of the present disclosure. Moreover, the separation of various components in the embodiments described herein is not meant to indicate that the separation occurs in all embodiments and the various components may be separated by different distances, if desired. Moreover, one of ordinary skill in the art will understood with the benefit of this disclosure that one or more of the components may be integrated together in a single component or separated into multiple components. While the cooking device 10 may include one or more components, it will be appreciated after reviewing this disclosure that one or more of these components may not be required, and other suitable components, features, and the like may be used in connection with the cooking device 10. For example, the cooking device 10 may include one or more components, features, aspects, and the like such as described in U.S. Pat. Nos. 10,292,531; 10,495,317; and 10,806,301; each of which is incorporated by reference in its entirety. The cooking device 10 may also include one or more components, features, aspects, and the like such as disclosed in U.S. patent application Ser. No. 17,195,477, filed March 8, entitled Cooking Device; U.S. patent application Ser. No. 17,195,467, filed March 8, entitled Distribution of Heat and/or Smoke within a Cooking Device; U.S. patent application Ser. No. 17,195,484, filed March 8, entitled Arrangement of Components within a Cooking Device; and U.S. patent application Ser. No. 17,195,488, filed March 8, entitled Cooking Device with Temperature Sensors; each of which is incorporated by reference in its entirety.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A drip tray for a cooking device, the drip tray comprising:
   a drawer including a first side, a second side, and a front portion, the drawer slidably disposed within an opening in a cooking device;
   a first portion of the drip tray connected to the first side and the second side of the drawer, the first portion of the drip tray spaced apart from the front portion of the drawer by a first gap;
   a second portion of the drip tray connected to the first side and the second side of the drawer, the first portion and the second portion of the drip tray being disposed in a generally V-shaped configuration;
   a third portion of the drip tray connected to the first side and the second side of the drawer; and
   a fourth portion of the drip tray connected to the first side and the second side of the drawer, the third portion and the fourth portion of the drip tray being disposed in a generally V-shaped configuration;
   wherein a lower portion of the first portion and the second portion is sloped towards a first aperture; and
   wherein a lower portion of the third portion and the fourth portion is sloped towards a second aperture.

2. The drip tray of claim 1, wherein the second portion and the third portion are disposed in a generally inverted V-shaped configuration.

3. The drip tray of claim 1, wherein the first portion of the drip tray includes four sides that are inequal in length;
   wherein the second portion of the drip tray includes four sides that are inequal in length;
   wherein the third portion of the drip tray includes four sides that are inequal in length;
   wherein the fourth portion of the drip tray includes four sides that are inequal in length; and
   wherein the first portion, the second portion, the third portions, and the fourth portion are contiguous portions of the drip tray.

4. The drip tray of claim 1, wherein the lower portion of the first portion and the second portion facilitates drippings from foodstuffs to traverse the sloped portion, pass through the first aperture, and enter a collection system that collects the drippings; and
   wherein the lower portion of the third portion and the fourth portion facilitates drippings from foodstuffs to traverse the sloped portion, pass through the second aperture, and enter the collection system that collects the drippings.

5. The drip tray of claim 1, wherein the lower portion of the first portion and the second portion is sloped in a first direction; and
   wherein the lower portion of the third portion and the fourth portion is sloped in a second direction, the first direction and the second direction being generally the same direction.

6. The drip tray of claim 1, wherein the drip tray comprises at least a portion of a heat and/or smoke ventilation system; and
   wherein the drip tray includes one or more opening that are sized and configured to facilitate heat and/or smoke distribution within a cooking device as part of the heat and/or smoke ventilation system.

7. The drip tray of claim 6, wherein the one or more openings in the drip tray comprises one or more openings in a first section of the drip tray and one or more openings in a second section of the drip tray.

8. The drip tray of claim 6, wherein the one or more openings in the first section of the drip tray comprises one or more openings in the second portion of the drip tray and the one or more openings in the second section of the drip trap comprises one or more openings in the third portion of the drip tray.

9. The drip tray of claim 8, wherein the one or more openings in the second portion of the drip tray comprises a first plurality of openings generally aligned along a first axis;
   wherein the one or more openings in the third portion of the drip tray comprises a second plurality of openings generally aligned along a second axis; and
   wherein the first plurality of openings generally aligned along the first axis are disposed generally parallel to the second plurality of openings generally aligned along the second axis.

10. The drip tray of claim 8, wherein the one or more openings in the second portion of the drip tray are spaced a generally equidistance apart; and
    wherein the one or more openings in the third portion of the drip tray are spaced a generally equidistance apart.

11. The drip tray of 1, wherein the drip tray is slidable within an opening in a sidewall of a cooking device, the drip tray being movable between a first position in which the drip tray is inserted into the cooking device through the opening and a second position in which the drip is removed from the cooking device through the opening.

12. The drip tray of claim 1, further comprising a diffuser attached to a lower surface of the drip tray.

13. A drip tray for a cooking device comprising:
    a first portion including four sides that are inequal in length;
    a second portion including four sides that are inequal in length, the first portion and the second portion being disposed in an angled configuration;
    a third portion including four sides that are inequal in length; and
    a fourth portion including four sides that are inequal in length, the third portion and the fourth portion being disposed in an angled configuration;
    wherein the first portion, the second portion, the third portions, and the fourth portion are contiguous portions of the drip tray.

14. The drip tray of claim 13, wherein the drip tray is at least partially disposed between a gas heat source and a solid fuel heat source.

15. The drip tray of claim 13, wherein the drip tray is sized and configured to control at least a portion of a flow of thermal energy produced by a solid fuel heat source towards the cooking structure.

16. The drip tray of claim 13, wherein the drip tray is sized and configured to facilitate distribute of heat and/or smoke from a solid fuel heat source; and
    wherein the drip tray is sized and configured to collect fluids dripping from foodstuffs placed on the cooking structure, a lower portion of the first portion and the second portion of the drip tray being angled such that the fluids proceed down the angled portion and exit the cooking chamber via a collection system, a lower portion of the third portion and the fourth portion of the drip tray being angled such that the fluids proceed down the angled portion and exit the cooking chamber via the collection system.

17. The drip tray of claim 13, wherein the drip tray is connected to a drawer, the drawer being movable between an open position and a closed position relative to the cooking chamber, the drawer allowing the drip tray to be at least partially removed from the cooking chamber when the drawer is in the open position.

18. The drip tray of claim 13, wherein the drip tray is sized and configured to be slidably disposed within an opening of the cooking chamber, the drawer sliding in and out of the opening in the cooking chamber when the drawer is moved between the open and closed positions; and wherein the drip tray is removable to allow the drip tray to be removed from the cooking device.

19. The drip tray of claim 13, wherein the drip tray comprising at least a portion of a heat and/or smoke distribution system;

wherein the heat and/or smoke distribution system at least partially controls a flow of heat and/or smoke from a solid fuel heat source towards a cooking structure; and wherein the drip tray includes one or more openings as part of the heat and/or smoke distribution system.

20. The drip tray of claim 13, wherein the drip tray at least substantially extends between a first side of the cooking chamber and a second side of the cooking chamber;

wherein a first gap is disposed between a front portion of the drip tray and a front portion of the cooking chamber; and wherein a second gap is disposed between a rear portion of the drip tray and a rear portion of the cooking chamber.

* * * * *